US 11,211,752 B2

(12) United States Patent
Ohtaka et al.

(10) Patent No.: US 11,211,752 B2
(45) Date of Patent: Dec. 28, 2021

(54) CONNECTOR WITH GROMMET

(71) Applicant: Yazaki Corporation, Tokyo (JP)

(72) Inventors: Kazuto Ohtaka, Shizuoka (JP); Jun Ishikawa, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 154 days.

(21) Appl. No.: 16/850,394

(22) Filed: Apr. 16, 2020

(65) Prior Publication Data
US 2020/0335919 A1    Oct. 22, 2020

(30) Foreign Application Priority Data

Apr. 18, 2019  (JP) .............................. JP2019-079210

(51) Int. Cl.
| H01R 13/73 | (2006.01) |
| H01R 13/74 | (2006.01) |
| B60R 16/02 | (2006.01) |
| H01R 13/52 | (2006.01) |
| H01R 13/629 | (2006.01) |

(52) U.S. Cl.
CPC ....... H01R 13/743 (2013.01); B60R 16/0222 (2013.01); H01R 13/5202 (2013.01); H01R 13/62938 (2013.01); H01R 2201/26 (2013.01)

(58) Field of Classification Search
CPC ............ H01R 13/5219; H01R 13/5202; H01R 13/62938; H01R 13/62933; H01R 13/743; H01R 33/00; B60R 16/0222
See application file for complete search history.

(56) References Cited

U.S. PATENT DOCUMENTS

| 5,139,431 | A | * | 8/1992 | Saitoh | ................ | H01R 13/6215 439/364 |
| 5,487,680 | A | * | 1/1996 | Yamanashi | ......... | B60R 16/0222 439/34 |
| 5,586,909 | A | * | 12/1996 | Saba | ................... | H01R 13/5202 439/559 |
| 5,971,791 | A | * | 10/1999 | Itoh | .................... | H01R 13/5202 439/364 |
| 6,183,275 | B1 | * | 2/2001 | Okura | .............. | H01R 13/62933 439/157 |
| 6,592,384 | B2 | * | 7/2003 | Sawayanagi | ....... | H01R 13/5202 439/157 |
| 6,638,099 | B2 | * | 10/2003 | Nakamura | ........... | H01R 13/641 439/489 |

(Continued)

FOREIGN PATENT DOCUMENTS

JP    2015-222667 A    12/2015

*Primary Examiner* — Thanh Tam T Le
(74) *Attorney, Agent, or Firm* — Sughrue Mion, PLLC

(57) ABSTRACT

A connector with a grommet includes a housing, a grommet, and a sensing member. A panel hooking portion, a flange, and a locking projection are formed on an outside of the housing. The sensing member includes a part received in a receiving part of the grommet and senses a locked state of the locking projection. The housing is provided with a flexible arm. The flexible arm is provided with the locking projection. The sensing member moves between the locking surface of the locking projection and a wall of the receiving part. When the locking projection is locked to the panel, the sensing member is pushed out by the panel in an anti-locking direction by a thickness of the panel.

5 Claims, 20 Drawing Sheets

(56) References Cited

U.S. PATENT DOCUMENTS

| | | | | |
|---|---|---|---|---|
| 6,685,496 B2* | 2/2004 | Ookura | .............. | H01R 13/5202 |
| | | | | 439/372 |
| 6,848,938 B2* | 2/2005 | Miyamoto | ........... | H01R 13/743 |
| | | | | 439/556 |
| 6,860,759 B2* | 3/2005 | Nakamura | ........... | H01R 13/745 |
| | | | | 439/557 |
| 7,150,640 B2* | 12/2006 | Fukui | ............... | H01R 13/62955 |
| | | | | 439/157 |
| 7,249,958 B2* | 7/2007 | Ishikawa | ............. | H01R 13/631 |
| | | | | 439/141 |
| 7,329,145 B2* | 2/2008 | Yagome | ............... | H01R 13/506 |
| | | | | 439/271 |
| 7,351,094 B2* | 4/2008 | Miyamoto | ......... | H01R 13/5205 |
| | | | | 439/157 |
| 7,607,940 B2* | 10/2009 | Ikeya | ................ | H01R 13/6215 |
| | | | | 439/559 |
| 9,071,007 B2* | 6/2015 | Muro | ................ | H01R 13/5202 |
| 9,825,397 B2* | 11/2017 | Watai | ................... | H01R 13/741 |
| 10,840,632 B2* | 11/2020 | Ogawa | .................. | H01R 13/74 |
| 10,873,151 B2* | 12/2020 | Zen | .................... | H01R 13/5219 |
| 10,913,407 B2* | 2/2021 | Baydoun | ............. | B60R 16/0222 |
| 2017/0062970 A1 | 3/2017 | Kikuchi | | |

* cited by examiner

RELEASE DIRECTION

CONNECTOR WITH GROMMET

CROSS-REFERENCE TO RELATED APPLICATION

The present application is based on, and claims priority from Japanese Patent Application No. 2019-079210, filed on Apr. 18, 2019, the entire contents of which are incorporated herein by reference.

TECHNICAL FIELD

The disclosure relates to a connector with a grommet.

BACKGROUND

A connector with a grommet to be attached to a panel of an automobile is disclosed in, for example, JP 2015-222667 A.

The connector with a grommet includes a connector housing (housing) and a grommet configured to cover an outer circumference of the connector housing. When a lock projection (locking projection) of the connector housing is located in a mounting hole of a vehicle body panel (panel), a sensing piece of the connector housing tilts and presses a thin part of the grommet. Accordingly, the thin part of the grommet bulges.

SUMMARY

However, even if the sensing piece of the housing tilts, the sensing piece is covered with the thin part of the grommet, so that the thin part of the grommet bulges only slightly.

For this reason, it is difficult to visually confirm the bulging of the thin part, and an operator needs to make sure the bulging of the thin part by touching the grommet with a hand. In the case of a narrow work space, it is also difficult for the operator to touch the grommet with the hand to confirm the bulging of the thin part.

In order to solve the above-mentioned problem, it is an object of the disclosure to provide a connector with a grommet that allows visual confirmation of a locking completed state in which a locking projection of a housing is locked to a panel, easily and reliably.

According to an embodiment, there is provided a connector with a grommet including: a housing including a panel hooking portion that is hooked on an edge of a mounting hole of a panel and is locked to the edge, an annular flange that faces the edge, and a locking projection that is locked to the panel by sandwiching the panel between the locking projection and the flange, wherein the panel hooking portion, the flange, and the locking projection are formed on an outside of the housing; a grommet including a panel contact part that is fitted into the flange so as to cover the flange and comes into tight contact with the edge; and a sensing member inserted into an insertion hole formed in the flange and including a part located outward than the insertion hole, the part of the sensing member being received in a receiving part formed on the panel contact part, the sensing member being pushed out by the panel to move to an outside of the flange when the locking projection is locked to the panel, to sense a locked state of the locking projection, wherein the housing is provided with a flexible arm which is resiliently deformable, the flexible arm is provided with the locking projection, the sensing member moves between a locking surface of the locking projection to be locked to the panel and a wall of the receiving part, and when the locking projection is locked to the panel, the sensing member is pushed out by the panel in an anti-locking direction by a thickness of the panel.

According to the embodiment, when the locking projection of the housing is locked to the panel, the sensing member is pushed out by the panel to move to the outside of the flange, so that the fact that the locking projection is locked to the panel can be visually confirmed easily and reliably.

DETAILED DESCRIPTION

Hereinafter, an embodiment of the disclosure will be described with reference to the drawings.

A first embodiment of the disclosure will be described with reference to FIGS. 1 to 21.

Figure 1:
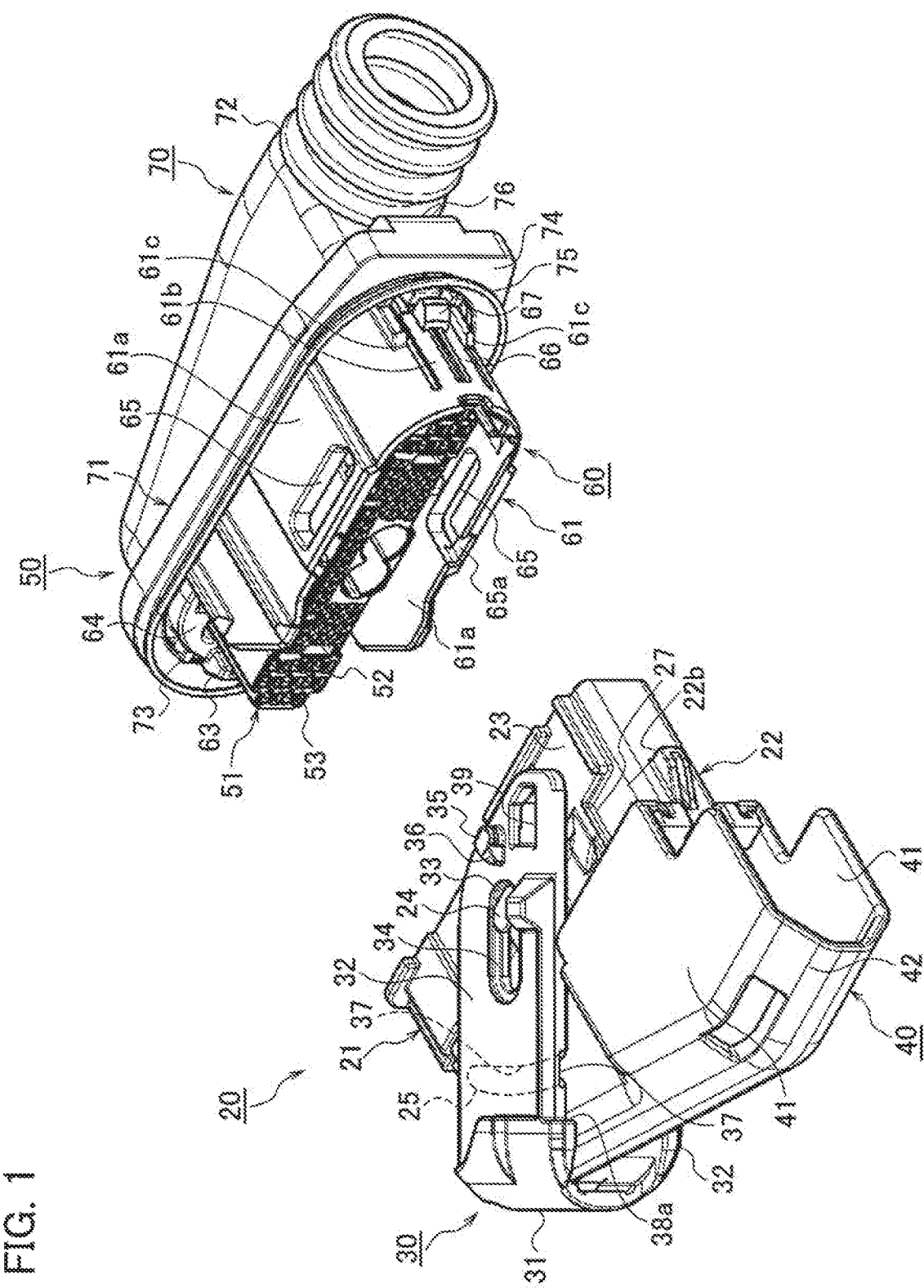
FIG. 1 is a perspective view illustrating a state before fitting of a lever-type connector according to a first embodiment of the disclosure.
Figure 21:
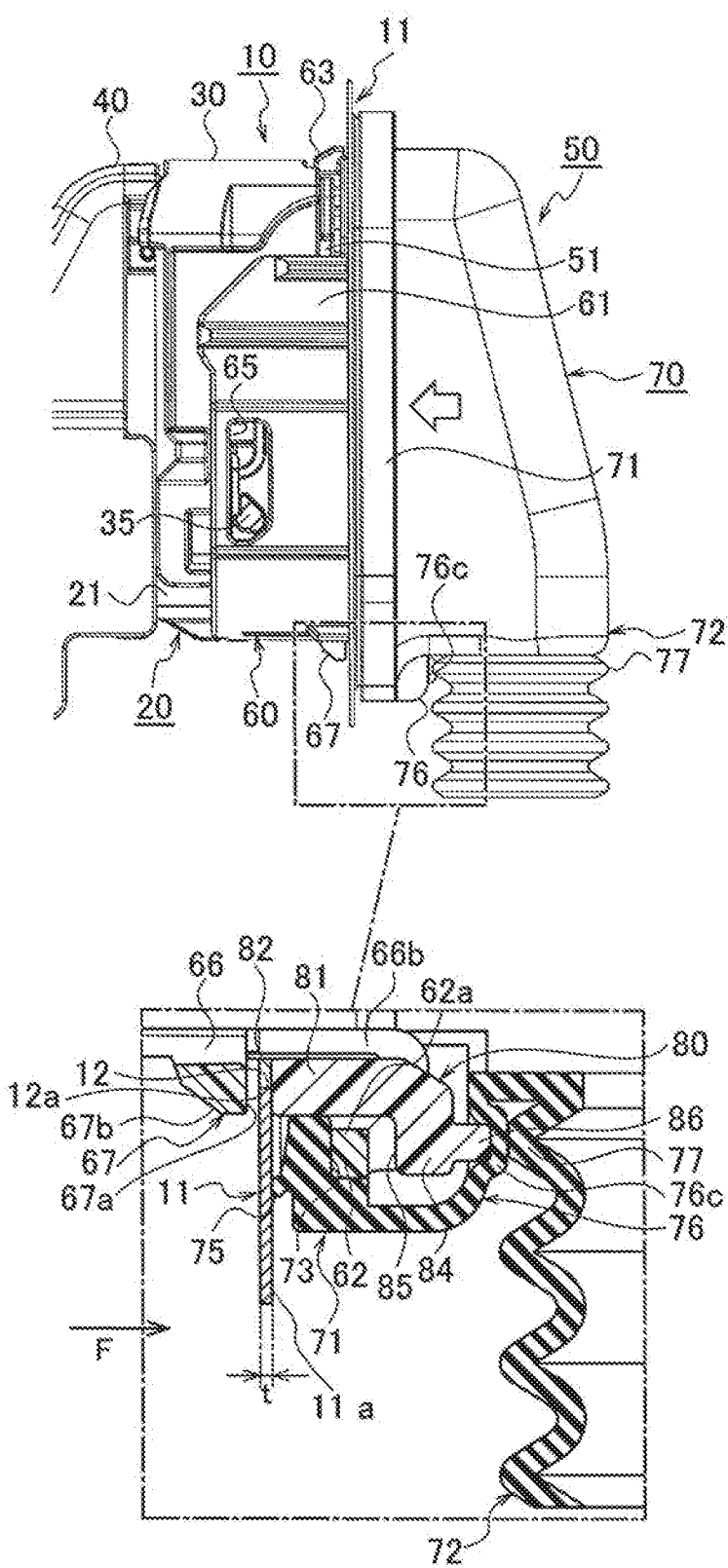
FIG. 21 is a side view illustrating a state in which the lever-type connector is assembled to the vehicle body panel according to the first embodiment.

As illustrated in FIGS. 1 and 21, the lever-type connector 10 includes a male connector 20 and a female connector (connector with a grommet) 50. The male connector 20 is arranged on an inside of a vehicle body panel (panel) 11 (a side opposite to a door side). The female connector 50 is arranged on an outside of the vehicle body panel 11 (door side).

Figure 4:
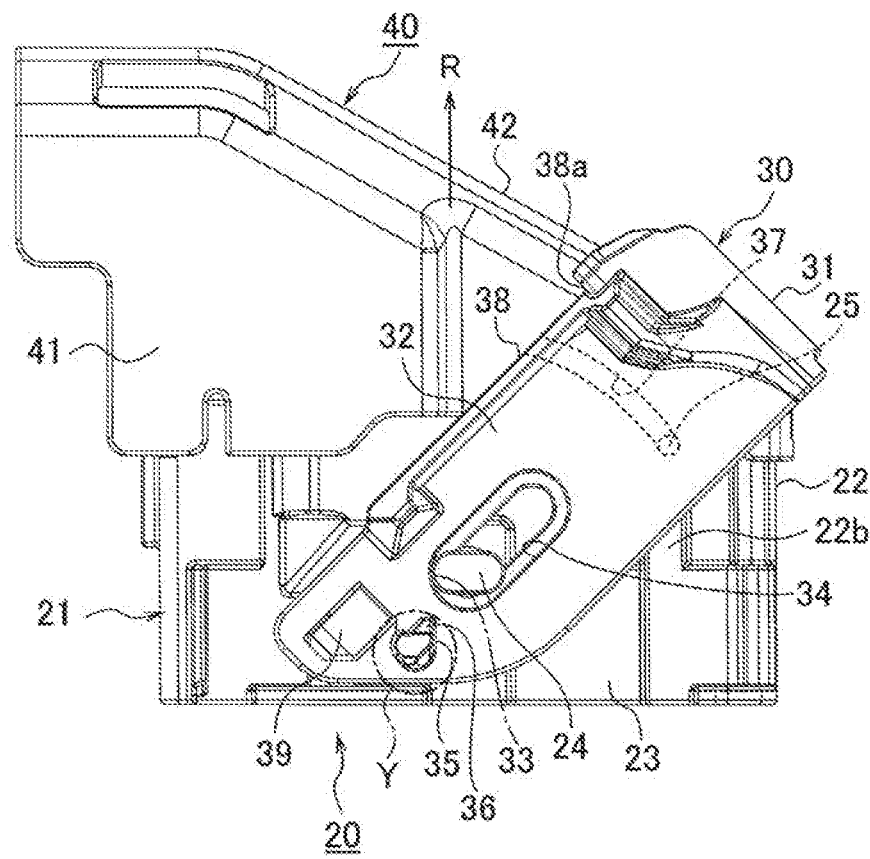
FIG. 4 is a side view of the male connector when a temporary setting is released.
Figure 6:
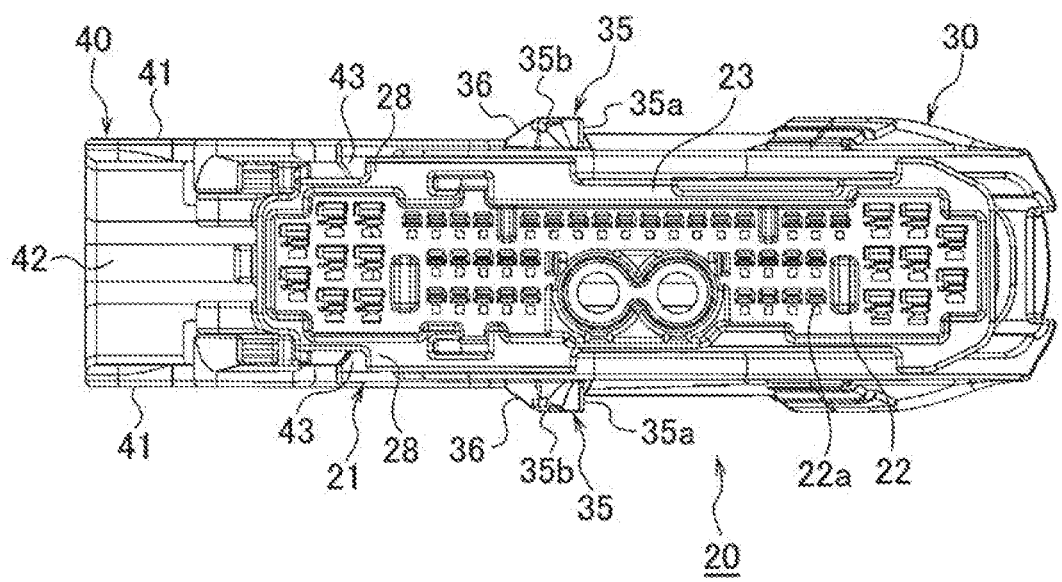
FIG. 6 is a bottom view of the male connector when the temporary setting is released.
Figure 7:
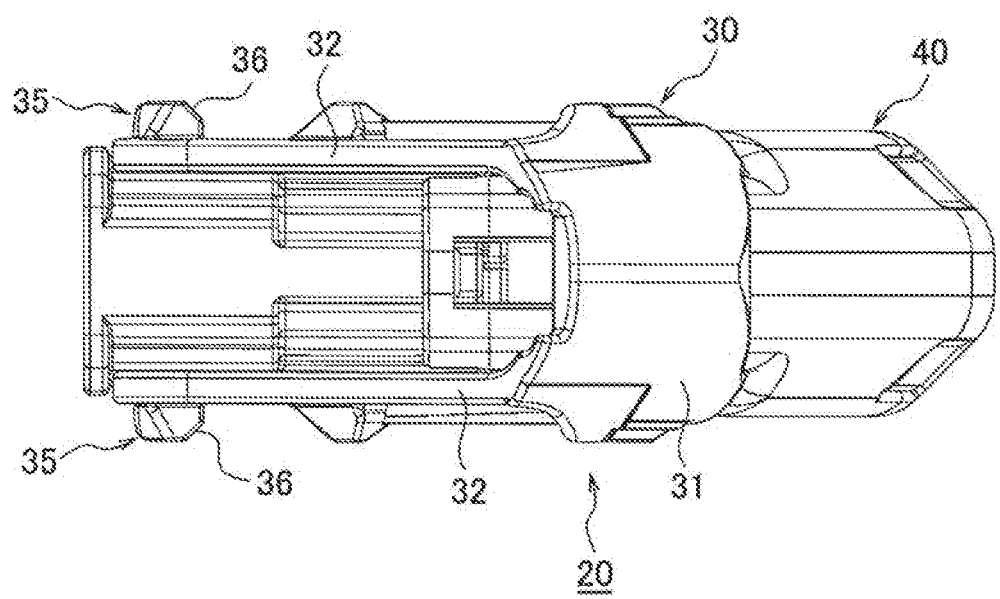
FIG. 7 is a plan view of the male connector when the temporary setting is released.

As illustrated in FIGS. 1, 4, and 6, the male connector 20 includes a male housing 21 made of a synthetic resin, a lever 30 made of a synthetic resin and a cable cover 40 made of a synthetic resin. The male housing 21 houses a plurality of male terminals (terminals), not illustrated, and is fitted into and disengaged from a female housing 51 of the female connector 50. The lever 30 is pivotably supported and slidably supported by the male housing 21 via support shafts 24 and 24 (only one support shaft 24 is illustrated in FIGS. 1 and 4). The lever 30 fits and disengages the male housing 21 and the female housing 51 by a pivoting operation. The cable cover 40 is mounted on the male housing 21 so as to cover a rear side of the male housing 21 (a side opposite to a side where the male connector 20 faces the female connector 50).

Figure 2:
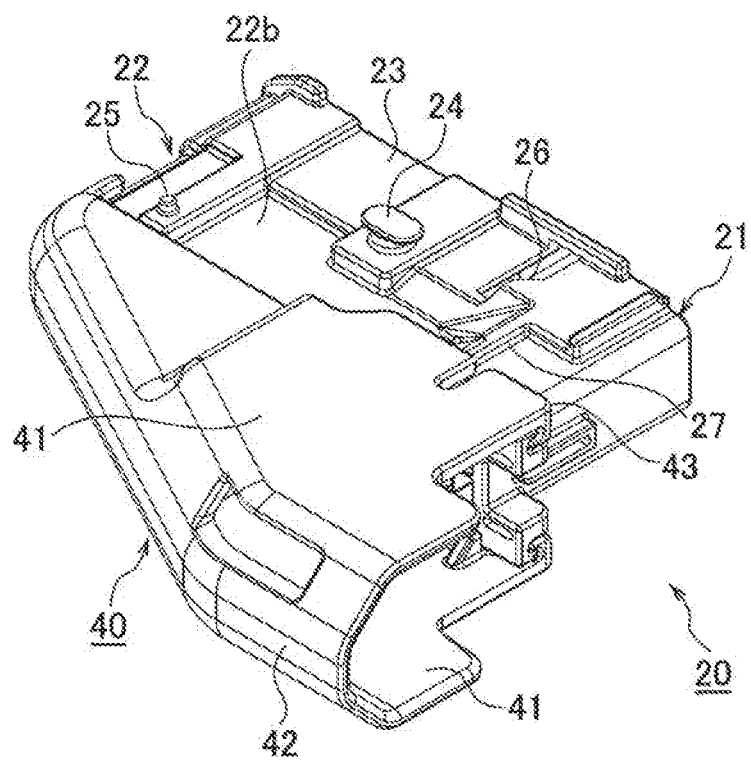
FIG. 2 is a perspective view of a male connector of the lever-type connector according to the first embodiment.

As illustrated in FIGS. 1, 2, and 6, the male housing 21 includes a housing body 22 having a rectangular block shape and a hood portion 23. The housing body 22 includes a plurality of terminal receiving holes 22a which receives male terminals. The hood portion 23 is formed integrally on the front side of the housing body 22 (the side where the male connector 20 faces the female connector 50) so as to protrude therefrom. A housing body 52 of the female housing 51 is fitted into the hood portion 23. The support shafts 24 and 24 extending in a direction perpendicular to a fitting direction of the connector are integrally formed so as to respectively protrude from boundaries between centers of side surfaces 22b and 22b on both sides of the housing body 22 and the hood portion 23. The support shafts 24 and 24 are pivot shafts of the lever 30.

Guide projections 25 and 25 are integrally formed on the rear side of side surfaces 22b and 22b on both sides of the housing body 22 (the side opposite to the side where the male connector 20 faces the female connector 50) so as to protrude therefrom, and at a position near an operation portion 31 of the lever 30, described later. As illustrated in FIG. 2, temporary locking recesses (temporary locked portions) 26 and 26 and final locking recesses (final locked portions) 27 and 27 are respectively formed on the hood portion 23 and the side surfaces 22b and 22b on both sides of the housing body 22, at positions corresponding to trajectories of the pivotal movements of projecting portions 39a and 39a of locking arms (locking portions) 39 and 39 of the lever 30, described later (only one temporary locking recess 26 and one final locking recess 27 are illustrated in FIG. 2).

Figure 3:
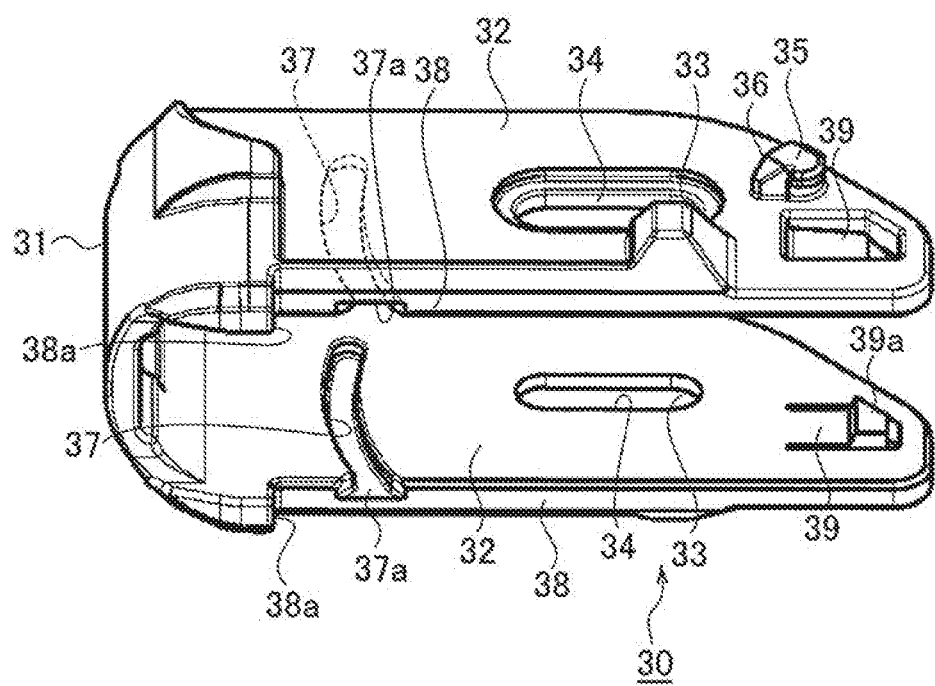
FIG. 3 is a perspective view of a lever of the lever-type connector according to the first embodiment.

As illustrated in FIGS. 1, 3, and 4, the lever 30 is mounted on the male housing 21 so as to cover a part of the male housing 21 of the male connector 20 and a part of the cable cover 40. The lever 30 pulls the male connector 20 and the female connector 50 toward each other by the pivoting operation from a lever pivot start position illustrated in FIG. 14A to a lever pivot completion position illustrated in FIG. 15A, to fit the male connector 20 and the female connector 50. The lever 30 includes the operation portion 31 and a pair of arm portions 32 and 32 extending from both sides of the operation portion 31.

As illustrated in FIGS. 1, 3, and 4, a bearing hole (bearing portion) 33 is formed at a center of each arm portion 32 of the lever 30. The bearing hole 33 includes a shaft sliding groove 34 in which the support shaft 24 slides. A column-shaped cam boss 35 is integrally formed so as to protrude from each arm portion 32.

Figure 5:
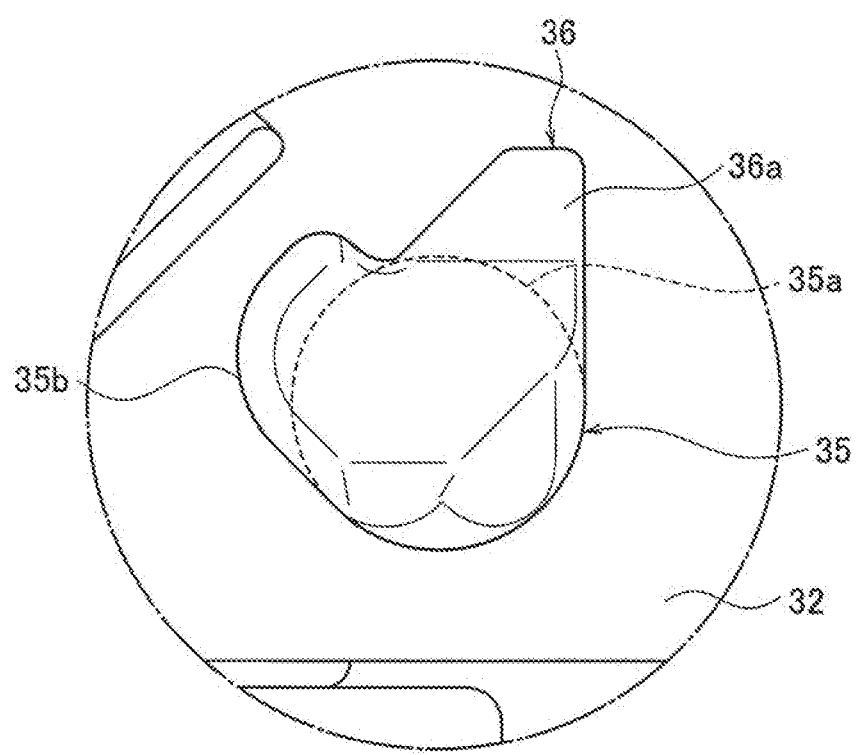
FIG. 5 is an enlarged view of a part Y in FIG. 4.
Figure 15A:
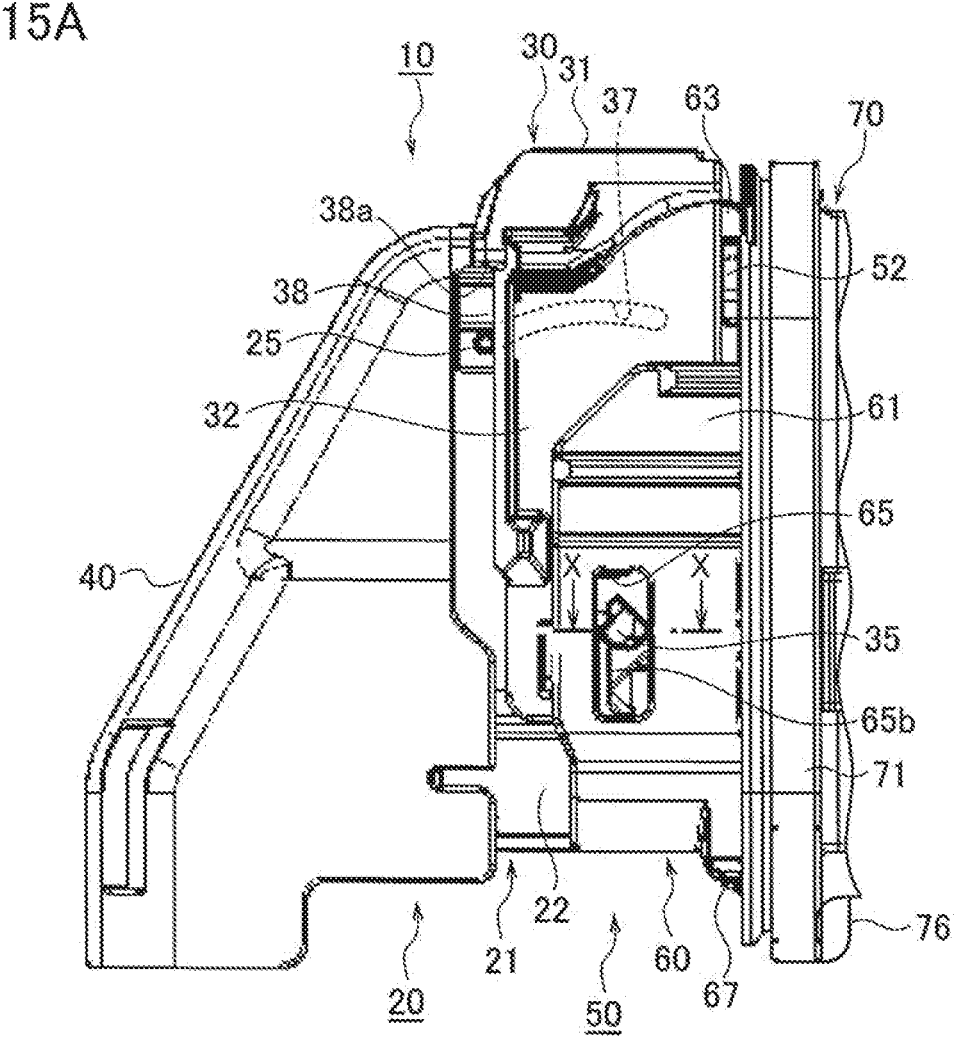
FIG. 15A is a side view illustrating the lever-type connector in a state at completion of the lever pivot according to the first embodiment.
Figure 15B:
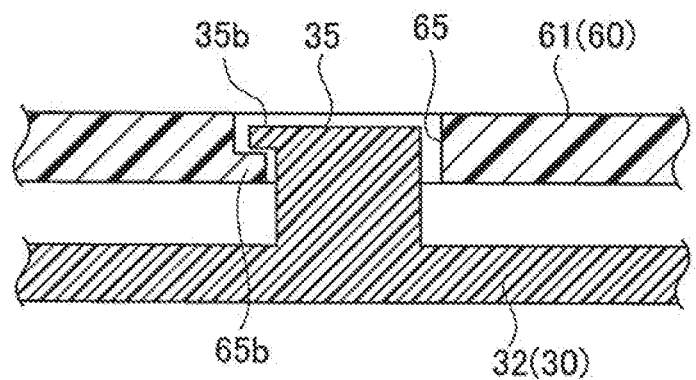
FIG. 15B is a schematic cross-sectional view taken along a line X-X in FIG. 15A.

As illustrated in FIGS. 4 to 7 and FIG. 14B, a projection 36 having a tapered portion 36a is integrally formed on an outside of the cam boss 35 in the temporary setting release direction (direction of disengagement of the connector) R so as to protrude therefrom. When the male connector 20 and the female connector 50 are fitted, the tapered portion 36a obliquely opposes a surface of a temporary locking projection 65a of the cam groove 65, described later, on the side of the temporary setting release direction R. Further, as illustrated in FIGS. 5 and 15B, a position control rib 35b that engages with a draw-in rib 65b of the cam groove 65 is integrally formed so as to protrude from the upper end of a shaft portion 35a of the cam boss 35. As illustrated in FIG. 3, an arc-shaped guide groove 37 with which the guide projection 25 engages, is formed between the operation portion 31 and the bearing hole 33 in each arm portion 32. The guide groove 37 is formed in an elongated arc shape centering on the bearing hole 33. On the open-end side of the guide groove 37, a pickup taper 37a for guiding the guide projection 25 is formed.

Figure 16:
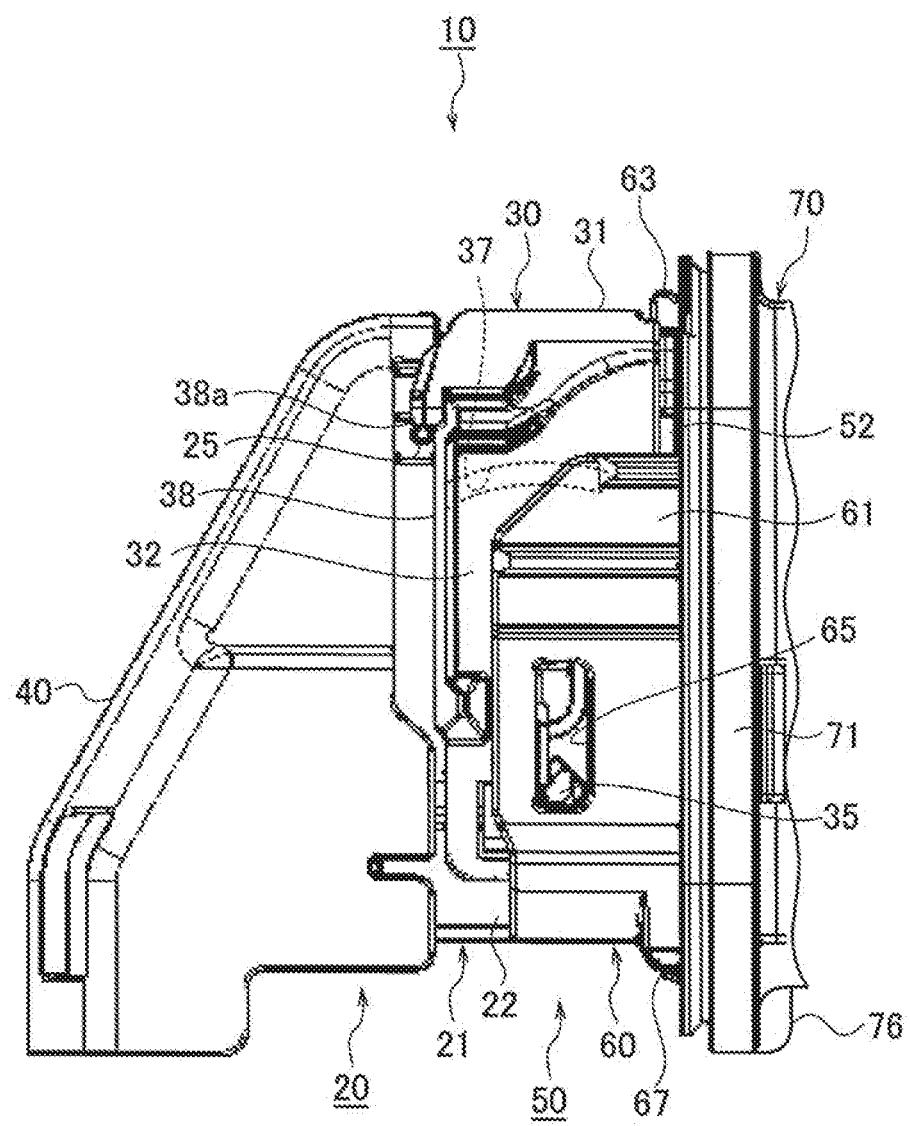
FIG. 16 is a side view illustrating a state in which sliding of the lever of the lever-type connector is completed according to the first embodiment.

As illustrated in FIG. 3, each arm portion 32 of the lever 30 is provided with a sliding portion 38 on which the guide projection 25 slides in the sliding direction after the pivot of the lever 30. The sliding portion 38 is formed in a rail shape with a concave inside. Further, each arm portion 32 is provided with a contact part 38a with which the guide projection 25 contacts at the end of the slide after the pivot of the lever 30. The guide projection 25 slides in the guide groove 37 by the pivoting operation of the lever 30, and after the male connector 20 and the female connector 50 are completely fitted, the guide projection 25 slides along the sliding portion 38 until the guide projection 25 butts the contact part 38a. With such a configuration, the lever 30 can slide with respect to the housing body 22 of the male housing 21, as illustrated in FIGS. 15A and 16.

As illustrated in FIGS. 1 and 3, the locking arm (locking portion) 39 that is resiliently deformed in a direction perpendicular to the fitting direction of the housings, is formed on an outside of the distal end of each arm portion 32 of the lever 30. The projecting portion 39a of the locking arm 39 is locked in and released from the temporary locking recess 26 or the final locking recess 27. With such a configuration, the locking arm 39 serves to lock and release the lever 30 with respect to the temporary locking recess 26 or the final locking recess 27.

As illustrated in FIGS. 1 and 2, the cable cover 40 includes a pair of side walls 41 and 41 forming an opening, and a curved and bent ceiling wall 42. As illustrated in FIG. 6, when the cable cover 40 is slid and mounted on the rear end side of the housing body 22 of the male housing 21 (an end on the side opposite to the side where the male connector 20 faces the female connector 50), lock portions 43 formed at the lower ends of the side walls 41 and 41 are locked to locked portions 28 formed in the housing body 22.

As illustrated in FIGS. 1 and 21, the female connector 50 with a grommet includes the female housing 51, a grommet 70 made of rubber, and an indicator (sensing member) 80 made of a composite resin. The female housing 51 includes a plurality of terminal housing chambers 53 configured to house female terminals (terminals), not illustrated. The female housing 51 includes a housing body 52 made of a synthetic resin and a cylindrical frame 60 made of a synthetic resin. The housing body 52 is fitted into and disengaged from the male housing 21 of the male connector 20. The frame 60 is fitted on the outer circumference of the housing body 52 to form an exterior and is locked in a mounting hole 12 of the vehicle body panel 11. The grommet 70 is mounted on a flange 62 of the frame 60. The sensing member 80 is inserted into an insertion hole 62a formed in the flange 62 and includes a part (sensing part 84) located outward than the insertion hole 62a (a side where the grommet 70 is located). The sensing part 84 is received in a receiving part 76 formed on a panel contact part 71. When a locking projection 67 is locked to the vehicle body panel 11, the sensing member 80 is pushed out by the vehicle body panel 11 to move toward a wall 76a of the receiving part 76 outside the flange 62. Accordingly, the sensing member 80 senses a locked state of the locking projection 67.

As illustrated in FIG. 1, the housing body 52 includes the plurality of terminal housing chambers 53 configured to house the female terminals and is formed into a rectangular block shape. At positions on both sides of the housing body 52 facing the temporary locking recesses 26 and 26 formed on the side surfaces 22b and 22b on both sides of the male housing 21, release projections (release parts), not illustrated, configured to release a temporary locking state between the projecting portions 39a and 39a of the locking arms 39 and 39 of the lever 30 and the temporary locking recesses 26 and 26, are formed respectively.

Figure 8:
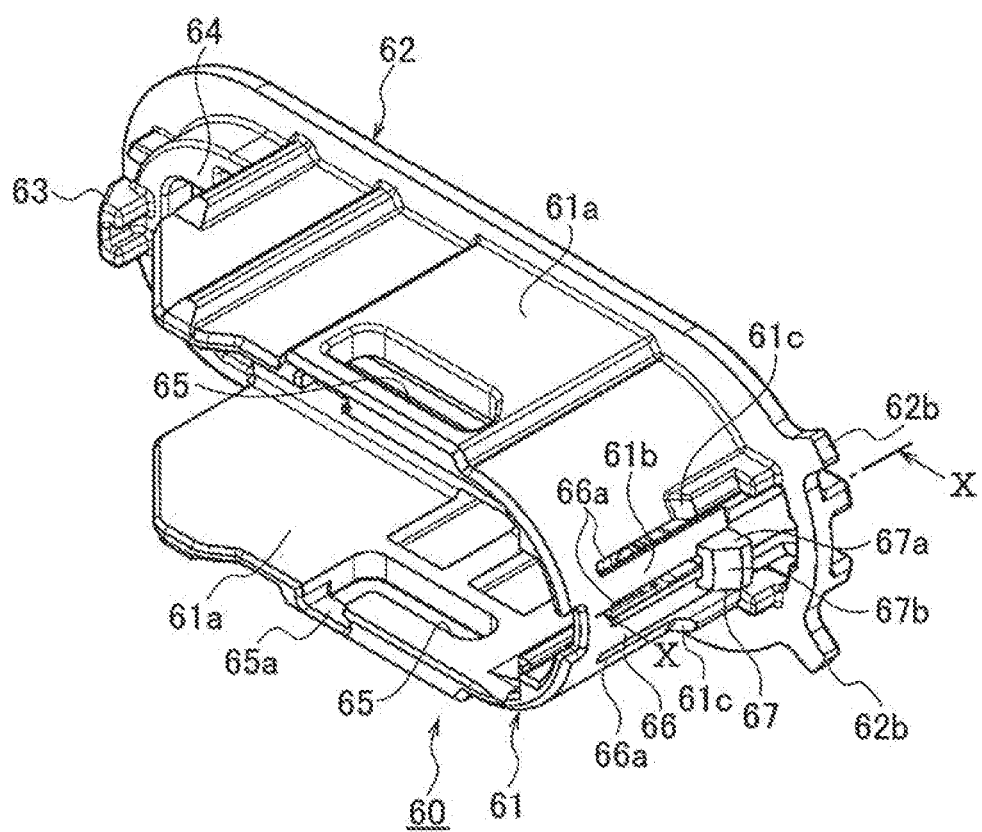
FIG. 8 is a perspective view of a frame of a female connector of the lever-type connector according to the first embodiment.

As illustrated in FIG. 8, the frame 60 includes a frame body 61 having a cylindrical shape notched on an upper surface, and the flange 62 having an annular plate-shape. The flange 62 is formed so as to integrally protrude outward from the entire circumference on one end of the frame body 61. The flange 62 faces an edge 12a of the mounting hole 12 of the vehicle body panel 11 when the female connector 50 is mounted on the vehicle body panel 11.

A panel hooking portion 63 which is hooked on the edge 12a and locked to the edge 12a of the mounting hole 12, is provided on an upper side of the frame body 61. By pivoting the female housing 51 with the panel hooking portion 63 as a fulcrum in a state where the panel hooking portion 63 is hooked on the edge 12a of the mounting hole 12, the locking projection 67, described later, can be locked in the mounting hole 12.

As illustrated in FIGS. 1 and 8, a locking frame portion 64 is provided below the panel hooking portion 63 of the frame body 61. The locking frame portion 64 locks the housing body 52 of the female housing 51 provided inside side walls 61a and 61a on both sides of the frame body 61 with a gap. A pair of abutting portions 61c and 61c are provided on both sides of a bottom wall 61b of the frame body 61. The abutting portions 61c and 61c butt the vehicle body panel 11 when the locking projection 67, described later, is not properly locked in the mounting hole 12 of the vehicle body panel 11. The hood portion 23 of the housing body 22 of the male housing 21 is fitted between the housing body 52 of the female housing 51 and the cylindrical frame body 61 of the frame 60. A pair of projecting portions 62b, 62b are formed on an outside of the flange 62 integrally with the flange 62 of the frame 60 at positions facing the abutting portions 61c and 61c so as to protrude from the flange 62. The projecting portions 62b and 62b are inserted into a deep groove portion 74 formed at the back of a flange fitting groove 73 of the grommet 70, described later, without penetration.

Figure 9:
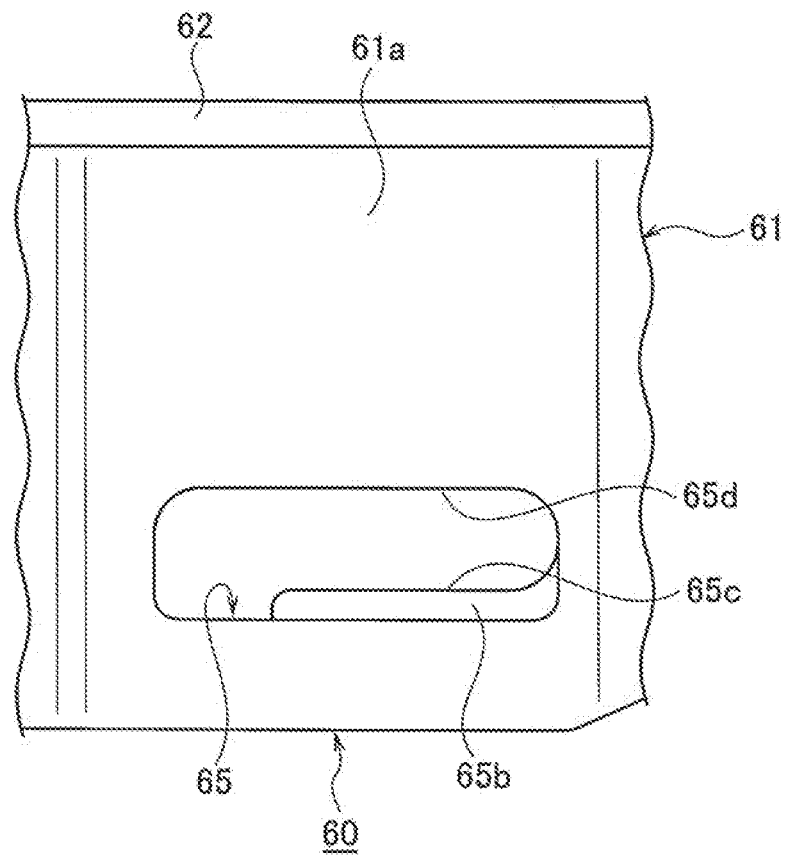
FIG. 9 is an enlarged side view around a cam groove of the frame.

As illustrated in FIGS. 8 and 9, cam grooves 65 and 65 with which the cam bosses 35 of the lever 30 are engaged, are formed on the opposite sides of the flange 62 at the center of the side walls 61a and 61a on both sides of the frame body 61, respectively. Each cam groove 65 includes the temporary locking projection 65a, the draw-in rib 65b, and a pushing-side sliding surface 65d. The temporary locking projection 65a is provided on the cam groove 65 side where an entrance is located. The draw-in rib 65b is formed with a drawn-in side sliding surface 65c extending in an L-shape from the temporary locking projection 65a. The pushing-side sliding surface 65d faces the drawn-in side sliding surface 65c of the draw-in rib 65b.

Figure 10:
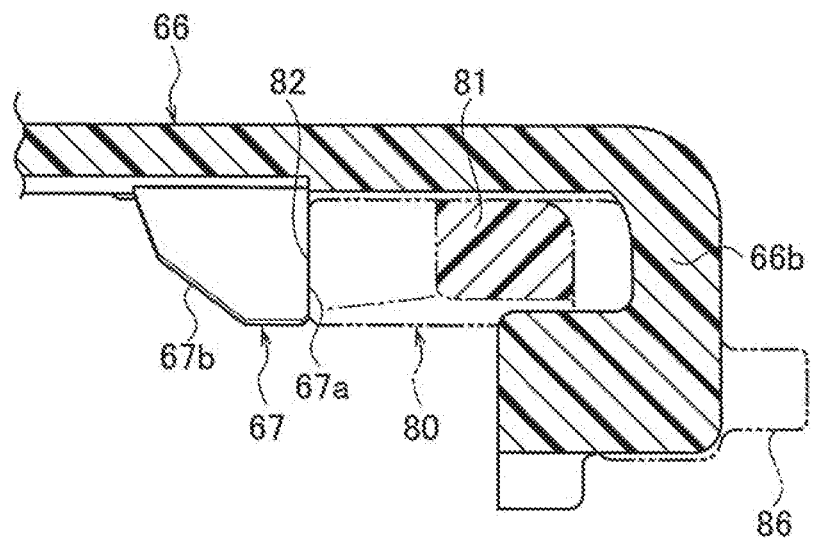
FIG. 10 is a cross-sectional view taken along a line X-X in FIG. 8.

As illustrated in FIGS. 8 and 10, a flexible arm 66, which is resiliently deformed via a laterally elongated slit 66a, is provided between the abutting portions 61c and 61c of the bottom wall 61b of the frame body 61. At a position near the flange 62 of the flexible arm 66, the locking projection 67 is formed on an outside of the flexible arm 66 so as to protrude outward (the side opposite to the side facing the bottom wall 61b). The locking projection 67 is locked to the vehicle body panel 11 by sandwiching the vehicle body panel 11 between the locking projection 67 and the flange 62 via a waterproof lip 75 of the grommet 70, described later, as illustrated in FIG. 21. The locking projection 67 includes a locking surface 67a locked to the edge 12a of the mounting hole 12 of the vehicle body panel 11, and an inclined surface (taper) 67b for guiding into the mounting hole 12.

Figure 20:
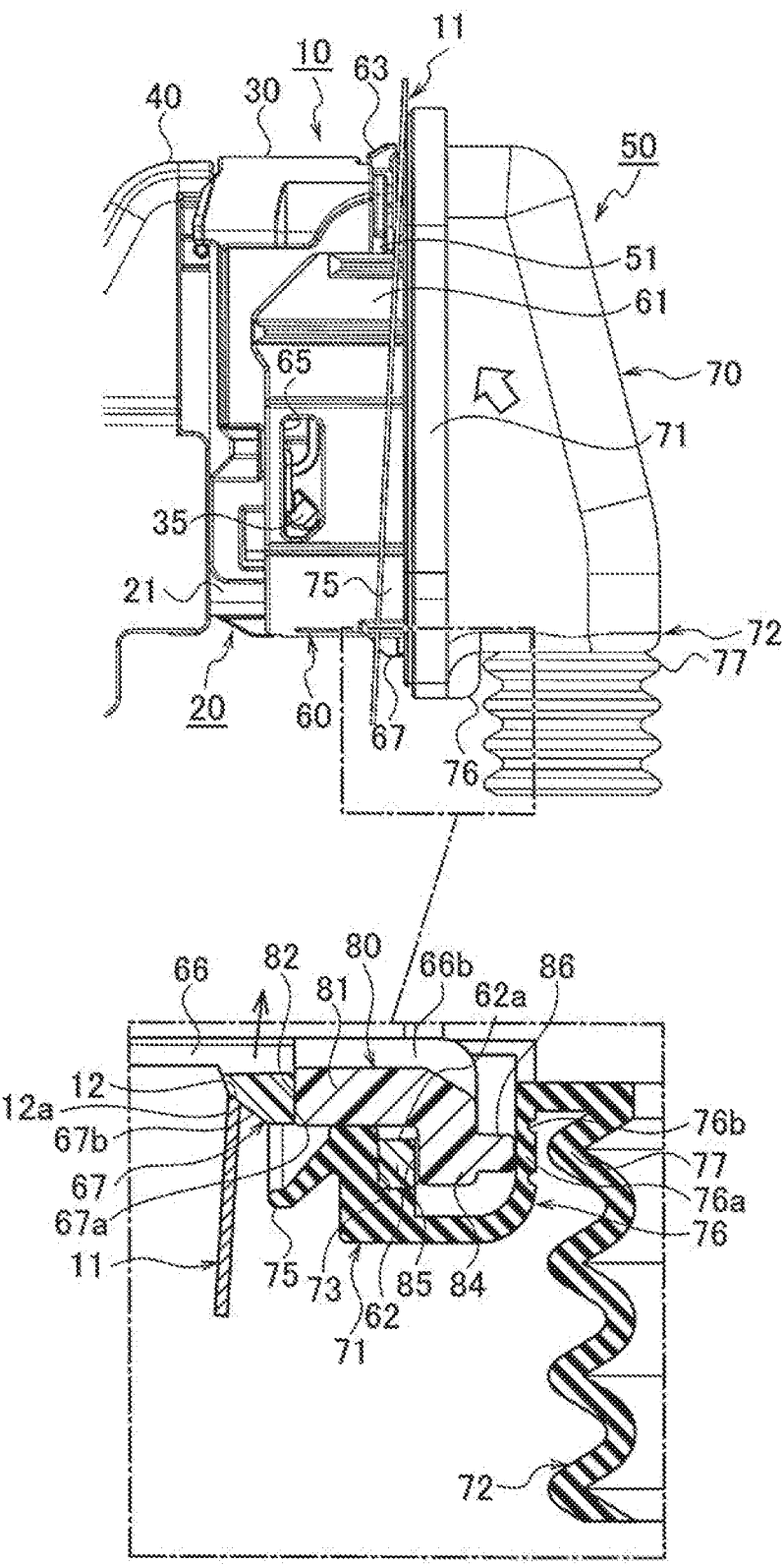
FIG. 20 is a side view illustrating a state in which the panel hooking portion of the lever-type connector is hooked on an edge of the mounting hole of the vehicle body panel according to the first embodiment.

As illustrated in FIGS. 10, 20, and 21, an indicator (sensing member) 80 configured to sense whether or not the locking projection 67 is locked properly to the vehicle body panel 11, is provided between an indicator engagement portion 66b of the flexible arm 66 and the locking surface 67a of the locking projection 67.

Figure 11A:
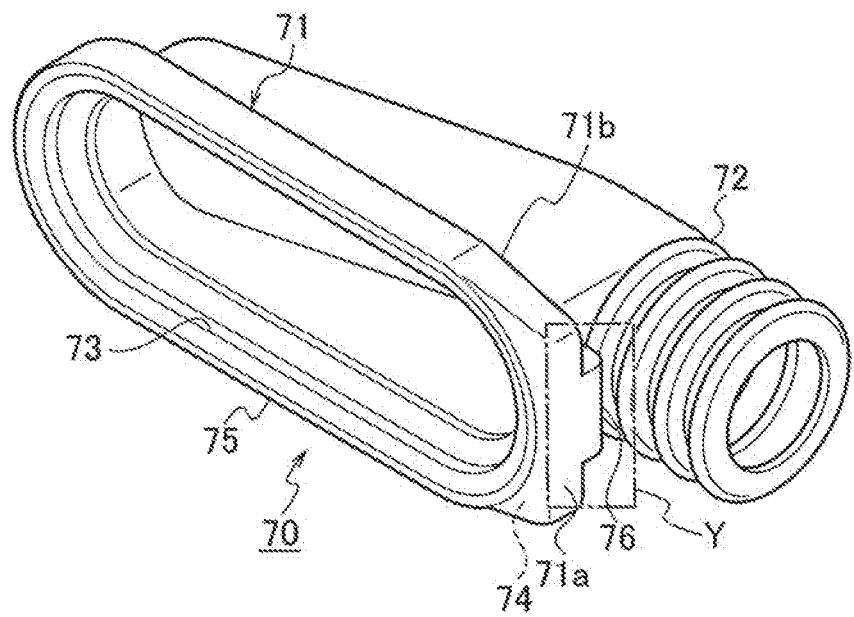
FIG. 11A is a perspective view of a grommet mounted on a flange of the frame as viewed from the front.

As illustrated in FIGS. 1 and 11A, the grommet 70 includes the panel contact part 71 and a cable receiving part 72. The panel contact part 71 is fitted into the flange 62 so as to cover the flange 62. The panel contact part 71 comes into tight contact with the edge 12a of the mounting hole 12 of the vehicle body panel 11 when the female connector 50 is mounted on the vehicle body panel 11.

As illustrated in FIG. 11A, the flange fitting groove 73 is formed inside the panel contact part 71. The flange 62 is inserted into the flange fitting groove 73 over the entire circumference of the flange 62. The deep groove portion 74 is formed below the flange fitting groove 73. The projecting portions 62b and 62b of the flange 62 are inserted into the deep groove portion 74 without penetration. The waterproof lip 75 is integrally formed on an outside of the panel contact part 71. When attaching the female connector 50 to the vehicle body panel 11, the waterproof lip 75 is pressed against a wall surface 11a around the edge 12a of the mounting hole 12 of the vehicle body panel 11 to come into tight contact with the edge 12a.

Figure 11B:
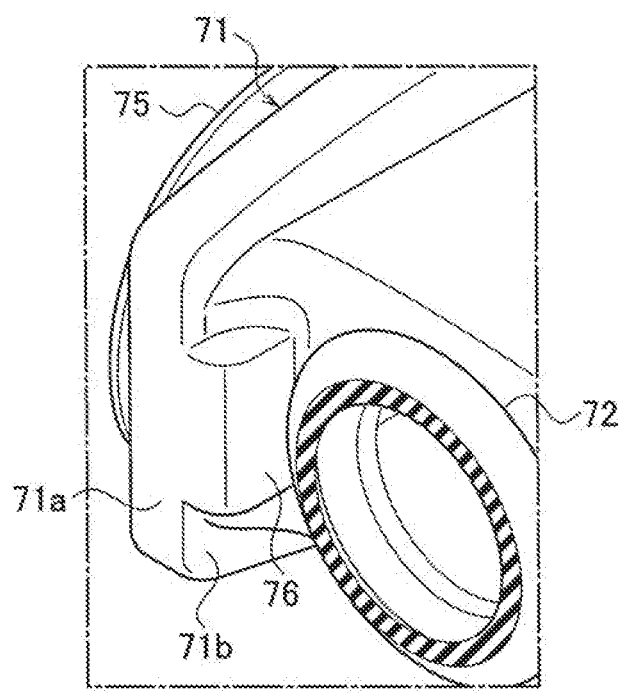
FIG. 11B is a perspective view of a part Y in FIG. 11A as viewed from the rear.

As illustrated in FIGS. 11A and 11B, the receiving part 76 configured to accommodate the sensing part 84 of the sensing member 80 is integrally formed so as to protrude from a bottom surface 71a to a back surface 71b of the panel contact part 71. The receiving part 76 communicates with the bag-shaped deep groove portion 74. As illustrated in FIG. 20, on an outer surface of the wall 76a of the receiving part 76 on which a projection 86 having a cylindrical shape used for sensing by the sensing member 80 contacts, an annular concave groove 76b having a diameter larger than a diameter of the projection 86 is formed. With such a configuration, when the wall 76a of the receiving part 76 is pushed outward in association with the movement of the projection 86, the wall 76a in the annular concave groove 76b bulges easily outward.

Figure 12A:
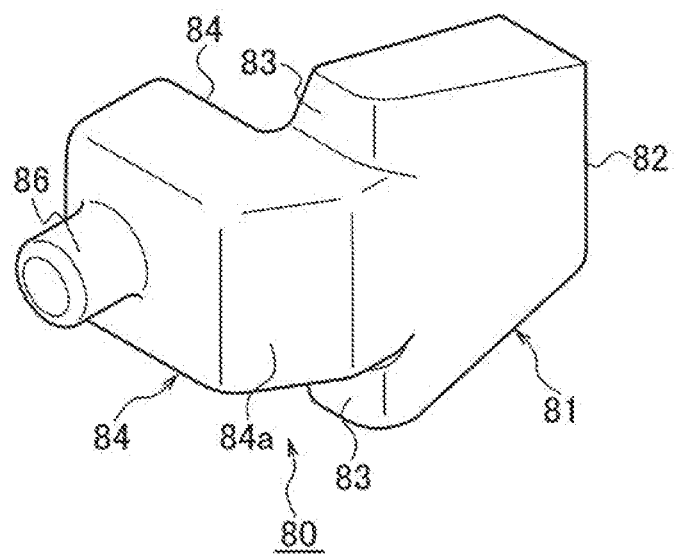
FIG. 12A is a perspective view of a sensing member used in the lever-type connector according to the first embodiment as viewed from the front.
Figure 12B:
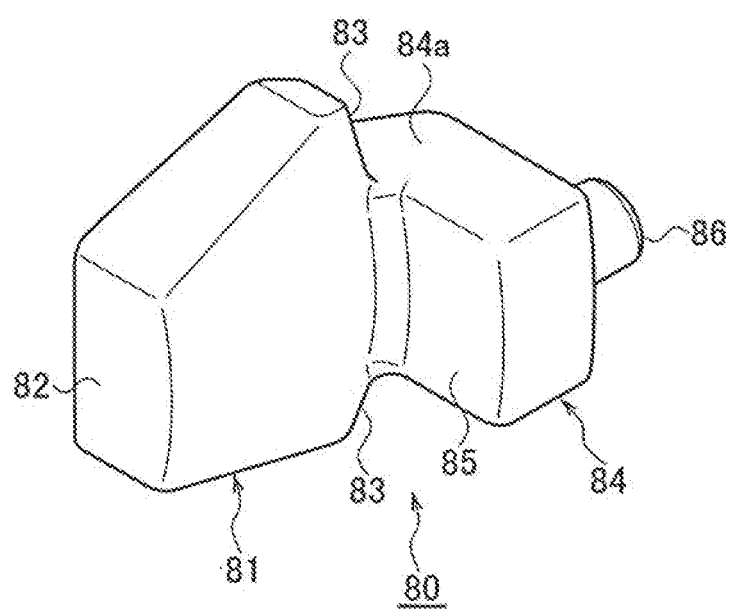
FIG. 12B is a perspective view of the sensing member as viewed from the rear.

As illustrated in FIGS. 12A and 12B, the sensing member 80 includes a contact part 81 and the sensing part 84. The contact part 81 includes a contact surface 82 configured to come into contact with the wall surface 11a of the vehicle body panel 11 or the locking surface 67a of the locking projection 67, and a locking surface 83 that is to be locked to the flange 62. The sensing part 84 is formed to be bent in an L-shape from the contact part 81. The sensing part 84 includes a locking surface 85 that is to be locked to the flange 62, and the projection 86 having the column shape used for sensing by the sensing member 80. The sensing part 84 contacts the wall 76a of the receiving part 76 of the grommet 70. A base portion 84a of the sensing part 84 is inserted into the insertion hole 62a formed in the flange 62, and the sensing part 84 on a side where the projection 86 is located, which is located outward than the insertion hole 62a, is received in the receiving part 76. As illustrated in FIGS. 20 and 21, the sensing member 80 is configured to be movable between the locking surface 67a of the locking projection 67 that is locked to the vehicle body panel 11 and the wall 76a of the receiving part 76. When the locking projection 67 is properly locked to the vehicle body panel 11, the sensing member 80 is pushed out by the vehicle body panel 11 in the anti-locking direction F (the direction away from the vehicle body panel 11) by the thickness t of the vehicle body panel 11.

Figure 13:
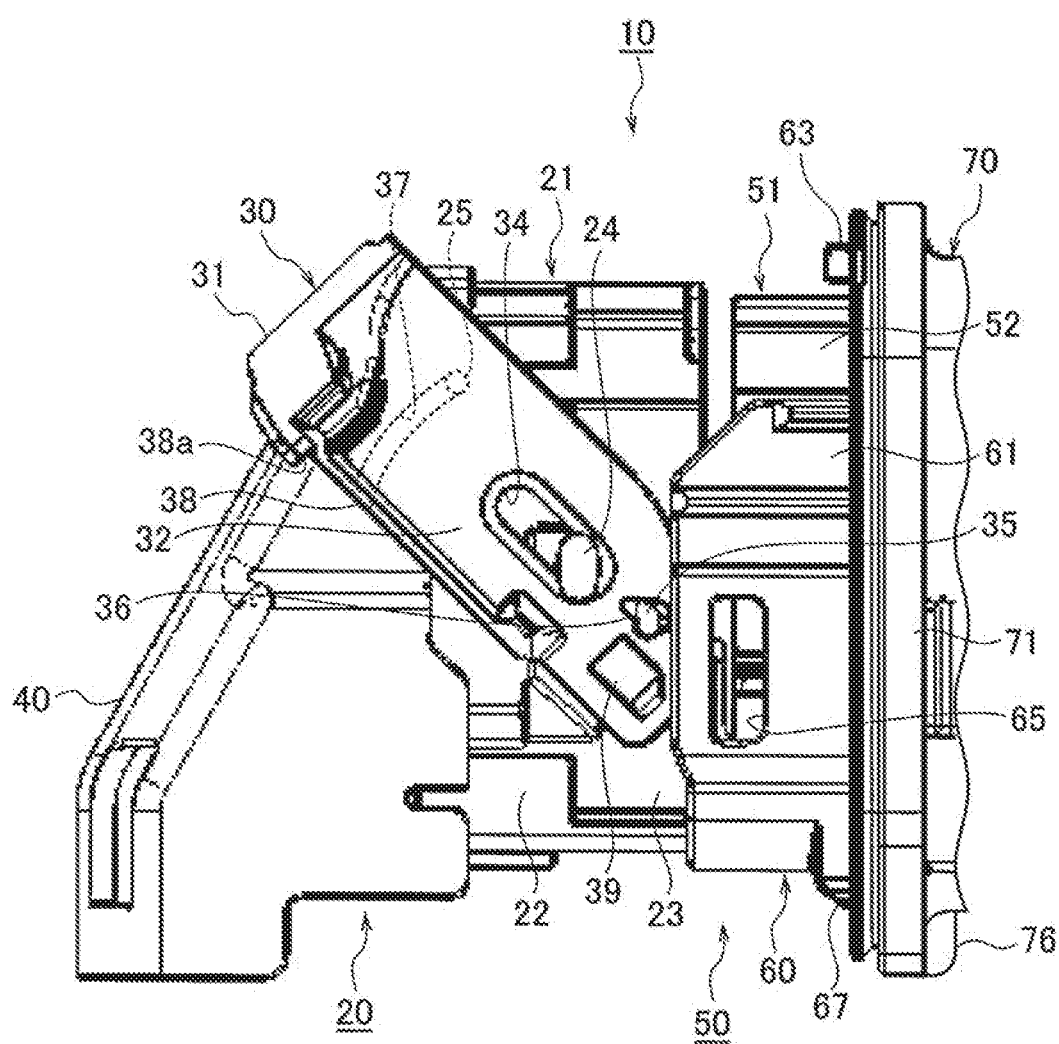
FIG. 13 is a side view illustrating a state before the temporary setting of the lever-type connector according to the first embodiment.

As described above, according to the lever-type connector 10 of the first embodiment, before assembling the lever-type connector 10 to the mounting hole 12 of the vehicle body panel 11 (before temporary setting), the bearing holes 33 and 33 having the shaft sliding grooves 34 and 34 of the lever 30 are assembled to the support shafts 24 and 24 of the male housing 21 of the male connector 20, and the projecting portions 39a and 39a of the locking arms 39 and 39 of the lever 30 are temporarily locked to the temporary locking recesses 26 and 26 of the male housing 21 to maintain the temporary locking state of the lever 30 as illustrated in FIGS. 4 and 13 (it is noted that FIG. 13 illustrates one sides of the male connector 20 and the female connector 50). When the lever 30 is in the temporary locking state with respect to the male housing 21, the lever 30 is not allowed to pivot in the fitting direction between the male housing 21 and the female housing 51 of the female connector 50.

When the housing body 52 of the female housing 51 is pushed into the hood portion 23 of the male housing 21 in the temporary locking state of the lever 30, the release projections, not illustrated, of the housing body 52 cause the locking arms 39 and 39 of the lever 30 to be resiliently deformed outward. Accordingly, the temporary locking state of the temporary locking recesses 26 and 26 of the male housing 21 and the projecting portions 39a and 39a of the locking arms 39 and 39 of the lever 30 is released, and the lever 30 is allowed to pivot in the fitting direction between the male housing 21 and the female housing 51.

Figure 14A:
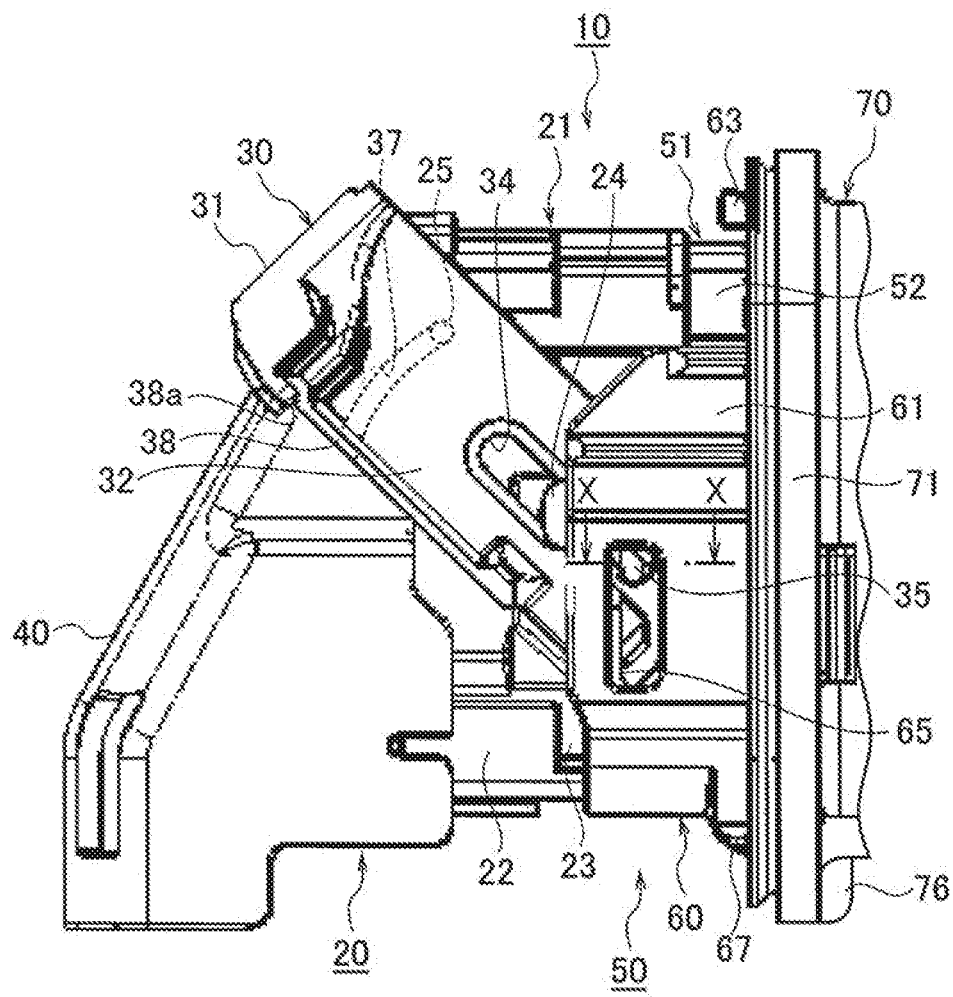
FIG. 14A is a side view illustrating the lever-type connector in a temporary setting state at a start of lever pivot according to the first embodiment.
Figure 14B:
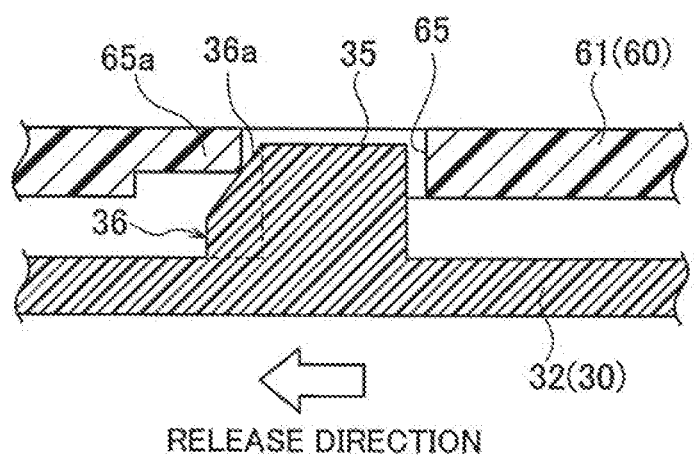
FIG. 14B is a cross-sectional view taken along a line X-X in FIG. 14A.

Next, as illustrated in FIG. 14A (it is noted that FIG. 14A illustrates one sides of the male connector 20 and the female connector 50), the male housing 21 and the female housing 51 are made face each other, and the cam bosses 35 and 35 of the lever 30 are inserted into the cam grooves 65 and 65 of the frame 60 of the female connector 50 to be locked to the temporary locking projections 65a and 65a formed at entrances of the cam grooves 65 and 65. The male housing 21 of the male connector 20 and the female housing 51 of the female connector 50 are brought into a temporary setting state by locking the cam bosses 35 and 35 of the lever 30 to the temporary locking projections 65a and 65a of the cam grooves 65 and 65. When releasing the temporary setting state, the male housing 21 is pulled out from the female housing 51 (pulled out in the temporary setting release direction R illustrated in FIG. 4), and the tapered portions 36a and 36a of the projections 36 and 36 provided on outsides of the cam bosses 35 and 35 slide over the temporary locking projections 65a and 65a of the cam grooves 65 and 65, so that the male connector 20 is smoothly disengaged from the female connector 50.

Next, as illustrated in FIG. 15A (it is noted that FIG. 15A illustrates one sides of the male connector 20 and the female connector 50), the lever 30 is pivoted around the support shafts 24 and 24 of the male housing 21 as a pivotal axis, and the shaft portions 35a and 35a of the cam bosses 35 and 35 come into contact with the drawn-in side sliding surfaces 65c and 65c of the cam grooves 65 and 65, so that the female housing 51 is drawn inward. When the female housing 51 is drawn inward, the position control ribs 35b and 35b of the cam bosses 35 and 35 contact the draw-in ribs 65b and 65b of the cam grooves 65 and 65, so that contact between the shaft portions 35a and 35a of the cam bosses 35 and 35 and the drawn-in side sliding surfaces 65c and 65c of the cam grooves 65 and 65 is maintained.

At this time, the lever 30 pivots by the movement of the guide projections 25 and 25 of the male housing 21 along the arc-shaped guide grooves 37 and 37 of the lever 30 while the support shafts 24 and 24 of the male housing 21 are in sliding contact with the bearing holes 33 and 33 of the lever 30.

Next, as illustrated in FIG. 15A, when the pivot of the lever 30 is completed, the lever 30 is allowed to slide with respect to the male housing 21. That is, when the pivot of the lever 30 ends, the guide projections 25 and 25 of the male housing 21 come off the pickup tapers 37a and 37a formed at the open ends of the arc-shaped guide grooves 37 and 37 of the lever 30, so that the lever 30 is allowed to slide with respect to the male housing 21.

Then, as illustrated in FIG. 16 (it is noted that FIG. 16 illustrates one sides of the male connector 20 and the female connector 50), by pushing the operation portion 31 of the lever 30, the lever 30 is slid along the guide projections 25 and 25 of the male housing 21, and the projecting portions 39a and 39a of the locking arms 39 and 39 of the lever 30 are locked to the final locking recesses 27 and 27 of the male housing 21. In this case, the lever 30 is brought into a final locked state with respect to the male housing 21. When the lever 30 slides, the support shafts 24 and 24 of the male housing 21 slide on the shaft sliding grooves 34 and 34 of the lever 30. By inserting the lever 30 into the frame 60 of the female housing 51 by sliding the lever 30, the fitting between the male housing 21 and the female housing 51 is completed.

Next, a procedure for assembling the lever-type connector 10 in which the male connector 20 is fitted into the female connector 50 into the mounting hole 12 of the vehicle body panel 11 will be described with reference to FIGS. 17 to 21.

Figure 17:
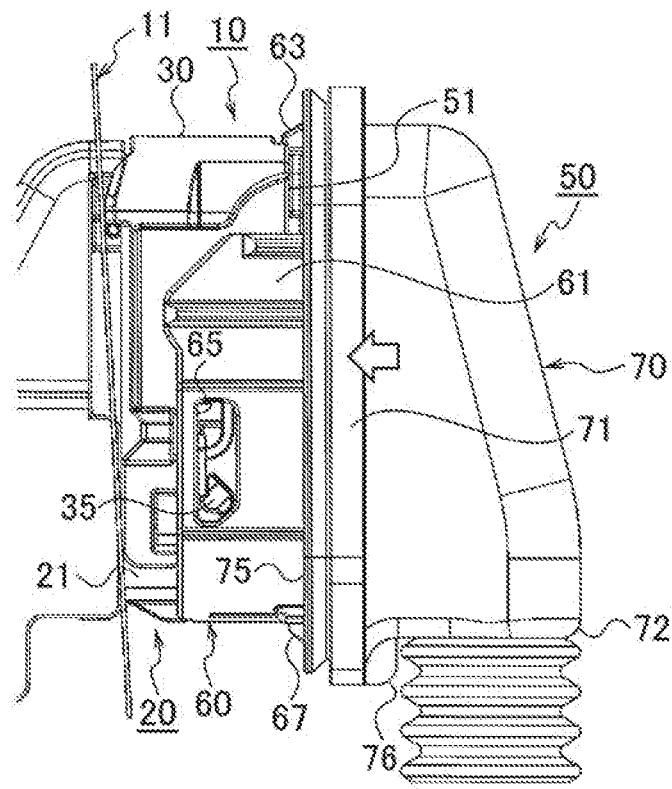
FIG. 17 is a side view illustrating a state in which the lever-type connector is passed through a mounting hole of a vehicle body panel according to the first embodiment.
Figure 18:
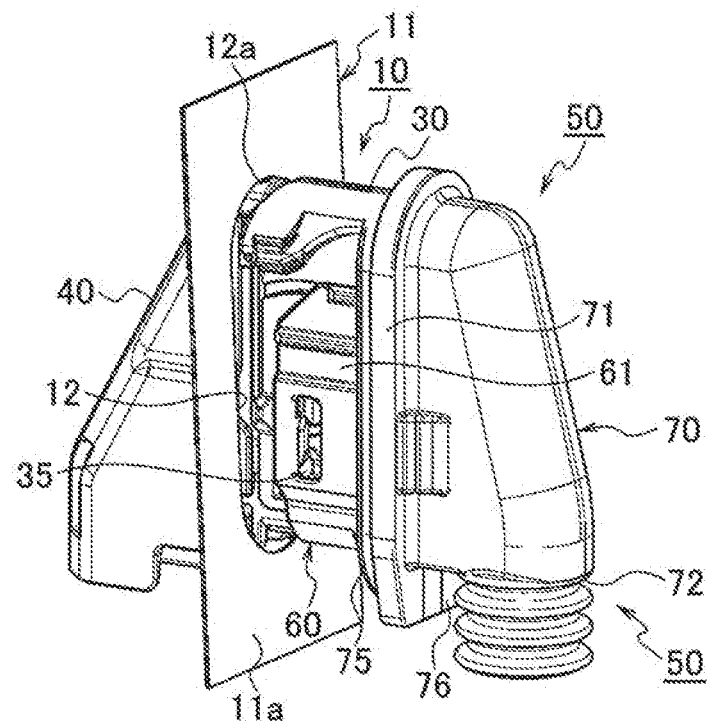
FIG. 18 is a perspective view illustrating the state in which the lever-type connector is passed through the mounting hole of the vehicle body panel according to the first embodiment.

As illustrated in FIGS. 17 and 18, the male connector 20 fitted into the female connector 50 is passed through the mounting hole 12 of the vehicle body panel 11 from the side where the door panel is located.

Figure 19:
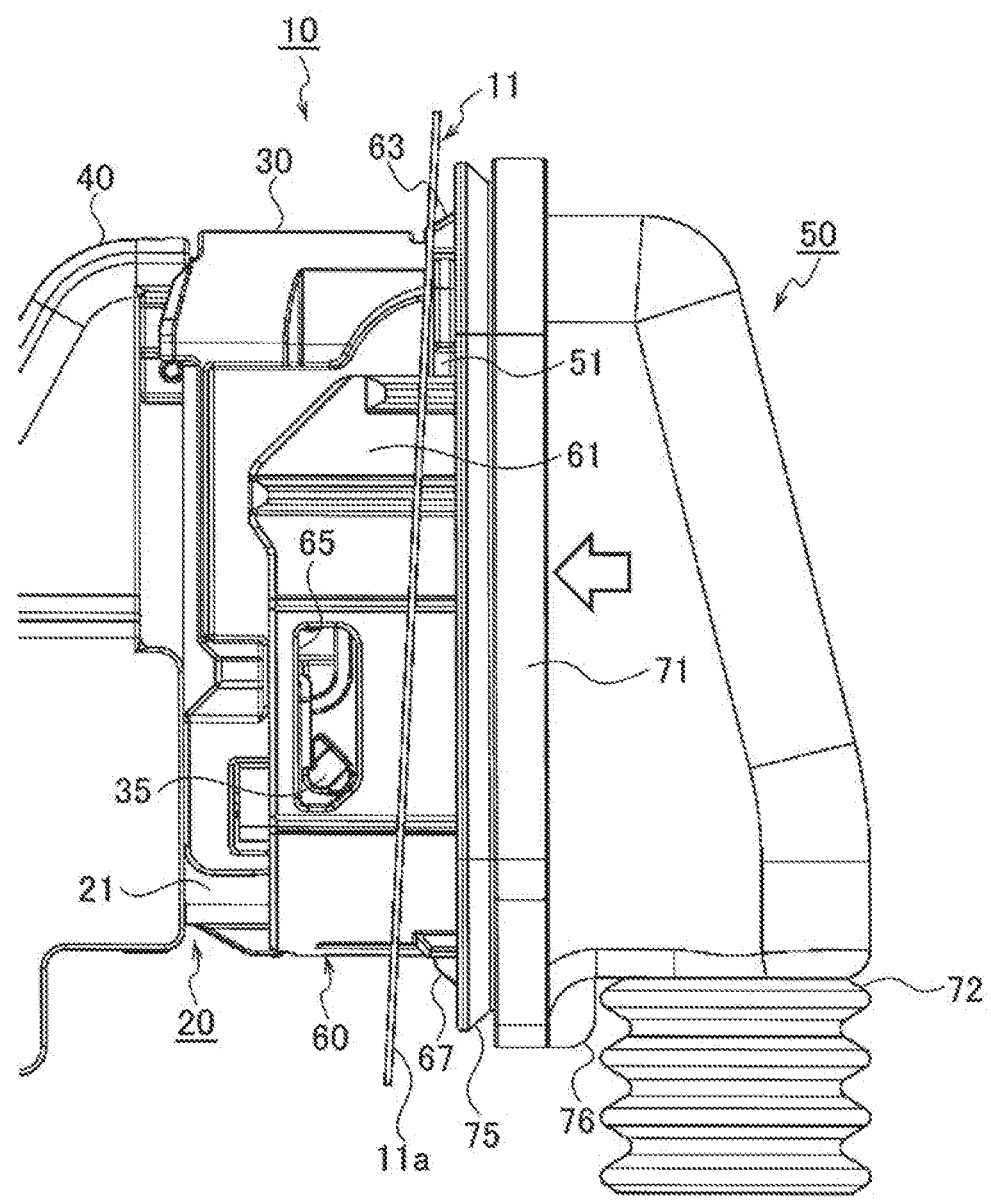
FIG. 19 is a side view illustrating a state in which a panel hooking portion of the lever-type connector is passed through the mounting hole of the vehicle body panel according to the first embodiment.

Next, as illustrated in FIG. 19, the panel hooking portion 63 of the frame 60 of the female connector 50 starts to be inserted into the mounting hole 12 of the vehicle body panel 11.

As illustrated in FIG. 20, by further inserting the panel hooking portion 63 of the frame 60 into the mounting hole 12 of the vehicle body panel 11, the panel hooking portion 63 is locked to the edge 12a in a state in which the panel hooking portion 63 is hooked on the edge 12a of the mounting hole 12. In a state in which the panel hooking portion 63 is not hooked on the edge 12a of the mounting hole 12, the abutting portions 61c and 61c of the frame 60 come into contact with the wall surface 11a of the vehicle body panel 11, so that the locking projection 67 of the frame 60 is not locked to the edge 12a of the mounting hole 12 of the vehicle body panel 11.

Then, by making the female housing 51 pivot about the panel hooking portion 63 as a fulcrum in a state in which the panel hooking portion 63 of the frame 60 is hooked on the edge 12a of the mounting hole 12 of the vehicle body panel 11 as illustrated in FIGS. 20 and 21, the inclined surface 67b of the locking projection 67 of the frame 60 comes into contact with the edge 12a of the mounting hole 12, and the flexible arm 66 provided with the locking projection 67 is vertically flexed, so that the locking projection 67 of the frame 60 is locked in the mounting hole 12 of the vehicle body panel 11. At this time, the waterproof lip 75 of the grommet 70 is pressed against the wall surface 11a of the vehicle body panel 11 without any gap, so that water can be prevented from entering through the mounting hole 12 of the vehicle body panel 11.

As illustrated in FIG. 21, in the locking completed state in which the locking projection 67 of the frame 60 is properly locked in the mounting hole 12 of the vehicle body panel 11, the sensing member 80 moves rearward by the wall surface 11a of the vehicle body panel 11 pushing a contact surface 82 of the contact part 81 of the sensing member 80 simultaneously with the locking of the locking projection 67. In association with the movement of the sensing member 80, the projection 86 of the sensing part 84 of the sensing member 80 pushes out the wall 76a of the receiving part 76 of the grommet 70 to make the wall 76a bulge to complete the locking of the locking projection 67.

In other words, when the locking projection 67 is properly locked to the vehicle body panel 11, the sensing member 80 is pushed out by the vehicle body panel 11 in the anti-locking direction F by the thickness t of the vehicle body panel 11, and the projection 86 make the wall 76a of the receiving part 76 bulge outward. Accordingly, a bulging portion 76c of the wall 76a contacts the ridge 77 of the bellows of the cable receiving part 72 without any gap.

On the other hand, as illustrated in FIG. 20, before the locking projections 67 is completely locked, a gap exists between the wall 76a of the receiving part 76 and the ridge 77 of the bellows of the cable receiving part 72. As described above, the difference in the state of the wall 76a is clear before and after the locking projection 67 is locked in the mounting hole 12 of the vehicle body panel 11, and good visibility is provided. Therefore, the operator can visually confirm the locking completed state of the locking projection 67 easily and reliably. Further, in order to ensure the visibility, only the sliding force for pushing out the sensing member 80 is required, and no large load is generated. For this reason, the length adjustment of the flexible arm 66 becomes unnecessary, and it is possible to avoid an increase in the assembling force to the vehicle body panel 11.

As illustrated in FIG. 21, the projection 86 of the sensing part 84 of the sensing member 80 is received in the wall 76a of the receiving part 76 of the grommet 70 without penetration, so that deterioration of waterproof performance of the grommet 70 is avoided.

Next, a second embodiment of the disclosure will be described with reference to FIGS. 22 to 24.

Figure 22:
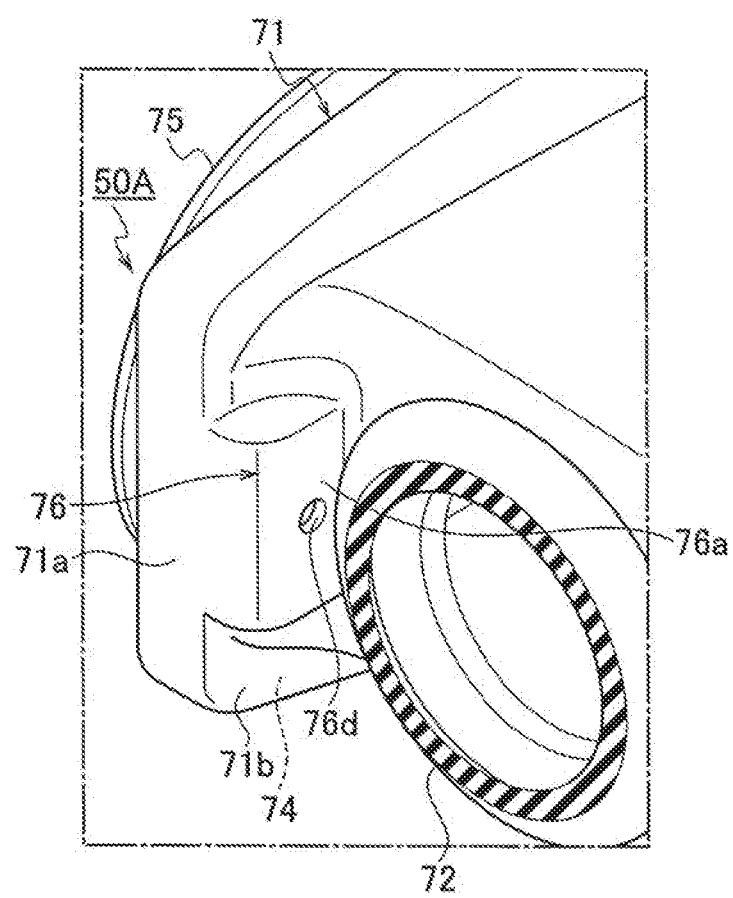
FIG. 22 is a perspective view of a principle part of a female connector of a lever-type connector according to a second embodiment of the disclosure as viewed from the rear.

As illustrated in FIG. 22, the second embodiment is different from the first embodiment in that the wall 76a of the receiving part 76 that receives the sensing part 84 of the sensing member 80 of the grommet 70 is provided with a sensing hole 76d having a circular shape where the projection 86 of the sensing part 84 is inserted, in the female connector 50A with a grommet. Since the other configuration is the same as that of the first embodiment, the same components are denoted by the same reference numerals, and detailed description is omitted.

Figure 24:
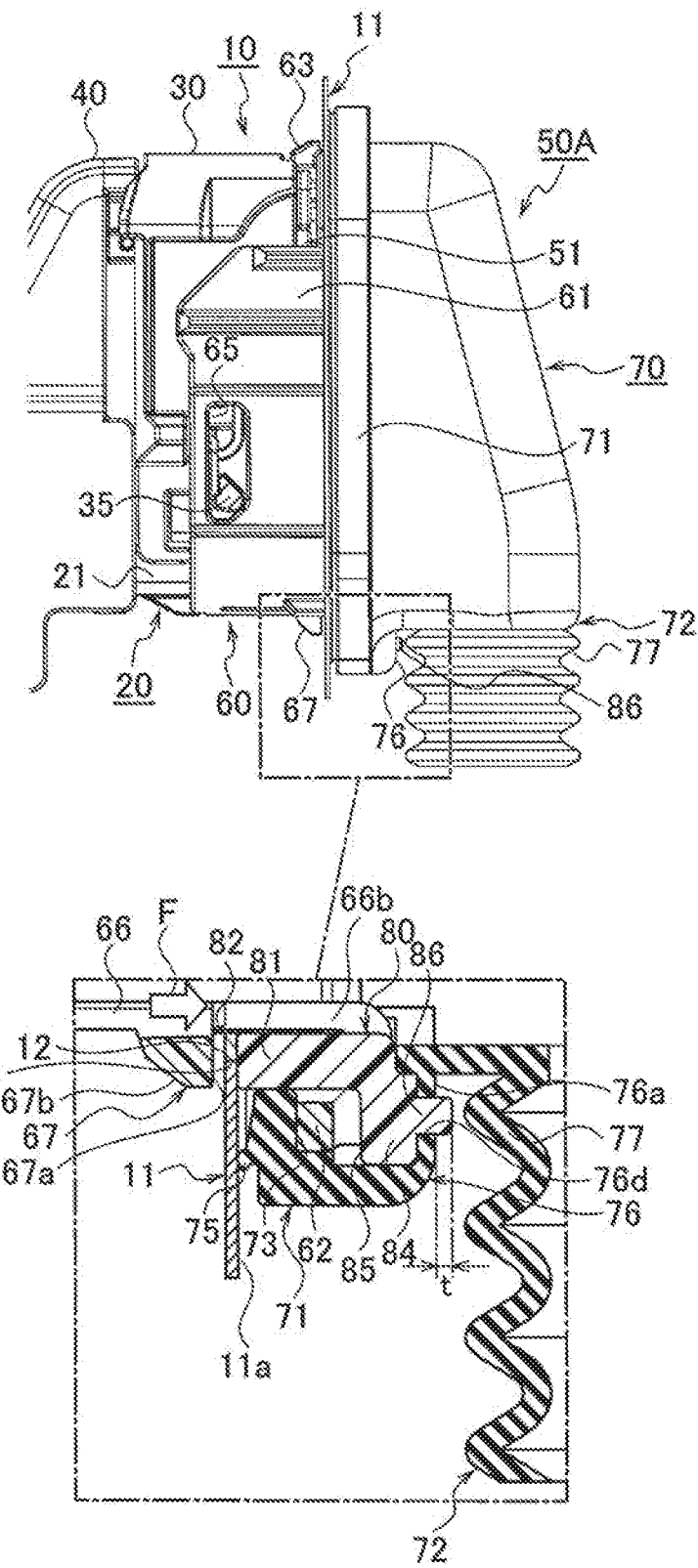
FIG. 24 is a side view illustrating a state in which the lever-type connector is assembled to the vehicle body panel according to the second embodiment.

As illustrated in FIG. 24, when the locking projection 67 is properly locked to the vehicle body panel 11, the sensing member 80 is pushed out by the vehicle body panel 11 in the anti-locking direction F by the thickness t of the vehicle body panel 11. Accordingly, the projection 86 of the sensing member 80 protrudes outward from the sensing hole 76d of the wall 76a of the receiving part 76 by a thickness t of the vehicle body panel 11.

Figure 23:
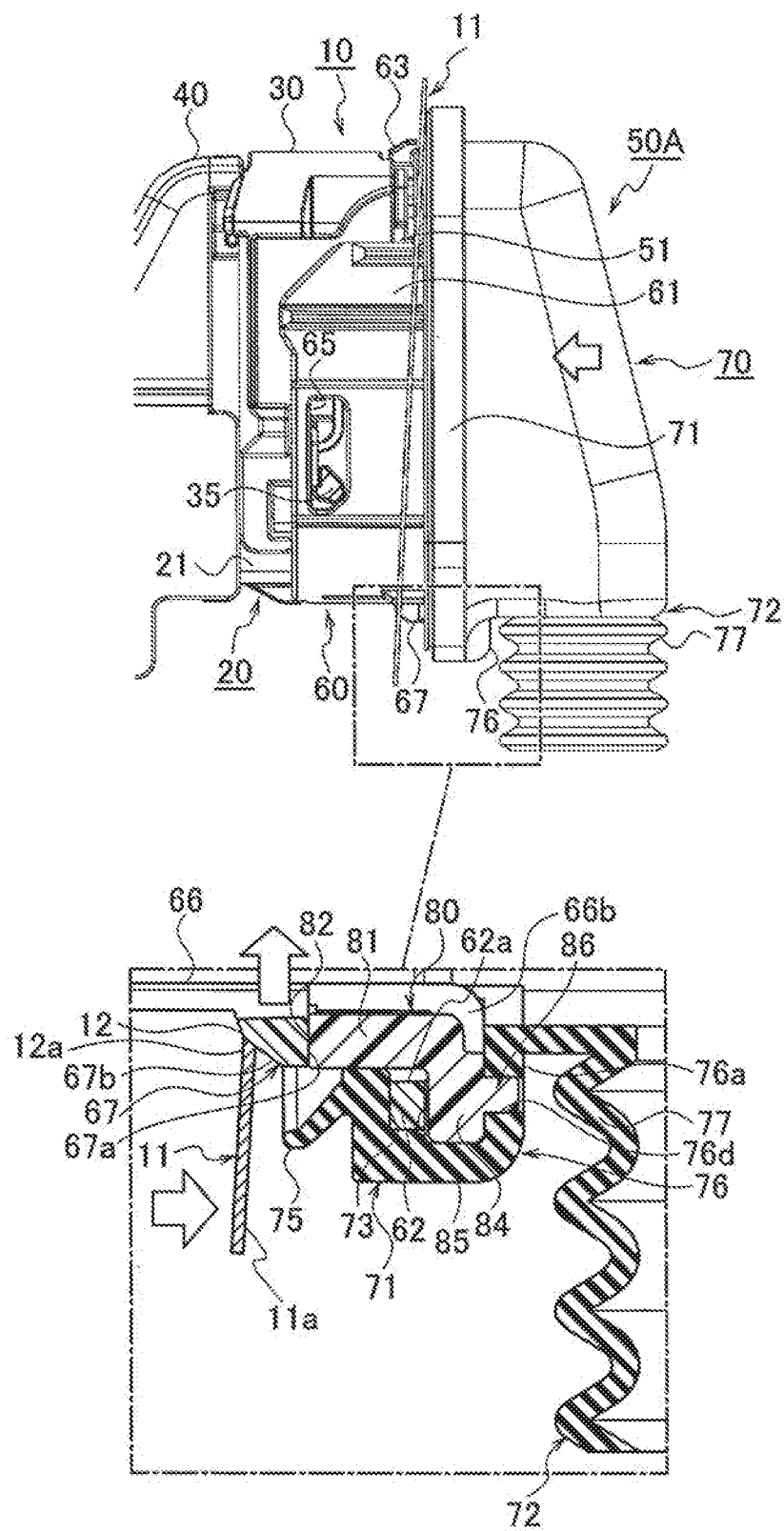
FIG. 23 is a side view illustrating a state in which a panel hooking portion of the lever-type connector is hooked on the edge of the mounting hole of the vehicle body panel according to the second embodiment.

On the other hand, as illustrated in FIG. 23, before the locking projection 67 is completely locked, the projection 86 does not protrude outward from the sensing hole 76d of the wall 76a of the receiving part 76. As described above, the difference in the state of the sensing hole 76d is clear before and after the locking projection 67 is locked in the mounting hole 12 of the vehicle body panel 11, and good visibility is provided. Therefore, the operator can visually confirm the locking completed state of the locking projection 67 easily and reliably. Further, since a large force is not required for pushing out the sensing member 80, that is, since only the force for sliding the projection 86 of the sensing member 80 in the sensing hole 76d of the wall 76a of the receiving part 76 is necessary, a large load is not generated, and thus the mounting force required when locking the locking projection 67 to the vehicle body panel 11, is little affected. Furthermore, since the sensing hole 76d provided in the wall 76a of the receiving part 76 is tightly closed by the sensing projection 86 of the sensing member 80, the waterproofness is sufficiently ensured.

Next, a comparative example will be described.

Figure 25:
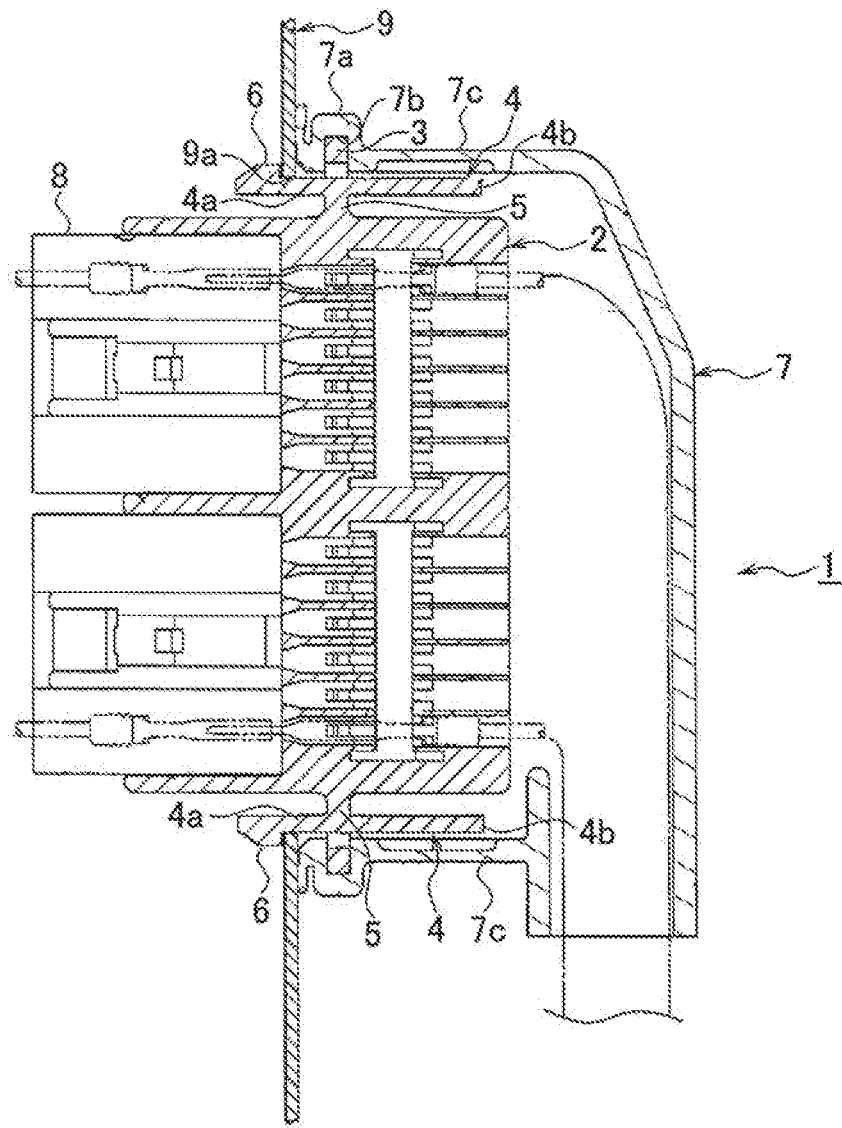
FIG. 25 is a cross-sectional view illustrating a state in which a connector housing of a connector with a grommet according to a comparative example is properly inserted into a mounting hole of the panel.
Figure 26:
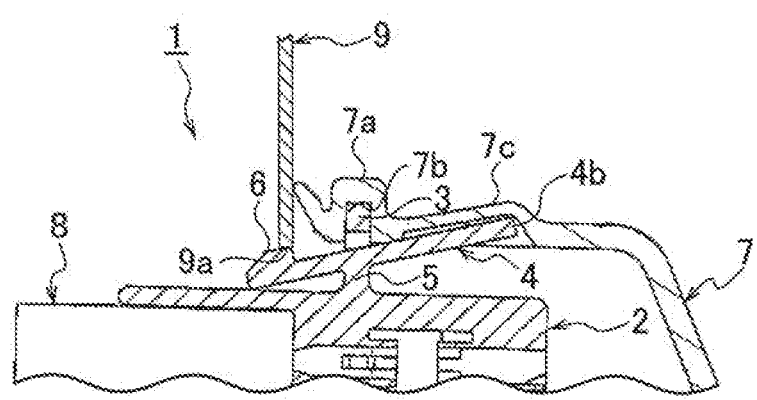
FIG. 26 is a partial cross-sectional view illustrating a state in which the connector housing of the connector with a grommet according to the comparative example is incompletely inserted into the mounting hole of the panel.

A connector 1 with a grommet according to the comparative example includes a connector housing 2 and a grommet 7 configured to cover an outer circumference of the connector housing 2 as illustrated in FIGS. 25 and 26. The connector housing 2 is mounted in a mounting hole 9a of a vehicle body panel (panel) 9 via a lock projection 6 (locking projection) thereof in a state in which the connector housing 2 is fitted into a mating connector housing 8. The grommet 7 includes a mounting portion 7a. The distal end portion of a flange part 3 of the connector housing 2 is fitted into a fitting groove 7b of the mounting portion 7a.

The flange part 3 includes a sensing piece 4 protruding in a front-rear direction via a fulcrum part 5. The sensing piece 4 includes an interference part 4a on the front side of the sensing piece 4 and includes a protruding part 4b on the rear side of the sensing piece 4. The interference part 4a includes a claw-shaped lock projection 6 protruding outward at the front end of the interference part 4a. The protruding part 4b presses a thin part 7c of the grommet 7 when the lock projection 6 is located in the mounting hole 9a.

As illustrated in FIG. 26, when the connector housing 2 is placed in an incompletely inserted state in the mounting hole 9a of the panel 9, that is, when the sensing piece 4 is still in a tilted state, and the lock projection 6 is in the mounting hole 9a, the protruding part 4b of the sensing piece 4 presses the thin part 7c of the grommet 7, and the thin part 7c of the grommet 7 bulges.

However, in the connector 1 with a grommet, when the connector housing 2 is placed in the incompletely inserted state in the mounting hole 9a of the panel 9, the sensing piece 4 in the tilted state is covered with the thin part 7c of the grommet 7. Therefore, it is difficult for an operator to visually confirm the state in which the thin part 7c of the grommet 7 is bulged.

As described above, in the connector 1 with a grommet, since the visibility of the sensing piece 4 is poor, the operator must touch the grommet 7 with the hand to confirm the bulging of the thin part 7c. In the case of a narrow work space, it is also difficult for an operator to touch the grommet 7 with the hand to confirm the bulging of the thin part 7c.

Note that according to the present embodiment, the lever-type connector is assembled to the vehicle body panel after the fitting between the male connector and the female connector. However, the disclosure is not limited thereto. For example, the male connector may be fitted into the female connector after assembling the female connector to the vehicle body panel.

According to the respective embodiments, the female connector is constituted by the female housing and the frame, and the cam groove is provided on the frame. However, the disclosure is not limited thereto. For example, the female connector may be constituted only by the female housing, and the female housing may be provided with a cam groove.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector with a grommet comprising:
   a housing including a panel hooking portion that is hooked on an edge of a mounting hole of a panel and is locked to the edge, an annular flange that faces the edge, and a locking projection that is locked to the panel by sandwiching the panel between the locking projection and the flange, wherein the panel hooking portion, the flange, and the locking projection are formed on an outside of the housing;
   a grommet including a panel contact part that is fitted into the flange so as to cover the flange and comes into tight contact with the edge; and
   a sensing member inserted into an insertion hole formed in the flange and including a part located outward than the insertion hole,
   the part of the sensing member being received in a receiving part formed on the panel contact part,
   the sensing member being pushed out by the panel to move to an outside of the flange when the locking projection is locked to the panel, to sense a locked state of the locking projection, wherein
   the housing is provided with a flexible arm which is resiliently deformable,
   the flexible arm is provided with the locking projection,
   the sensing member moves between a locking surface of the locking projection to be locked to the panel and a wall of the receiving part, and
   when the locking projection is locked to the panel, the sensing member is pushed out by the panel in an anti-locking direction by a thickness of the panel.

2. The connector with a grommet according to claim 1, wherein when the locking projection is locked to the panel, (i) the sensing member is pushed out by the panel in the anti-locking direction by the thickness of the panel, (ii) a projection for sensing of the sensing member makes the wall of the receiving part bulge outward, and (iii) a bulging portion of the wall comes into contact with a ridge of bellows of a cable receiving part of the grommet without a gap.

3. The connector with a grommet according to claim 1, wherein when the locking projection is locked to the panel, the sensing member is pushed out by the panel in the anti-locking direction by the thickness of the panel, and a projection for sensing of the sensing member protrudes outward from a sensing hole formed in the wall of the receiving part.

4. The connector with a grommet according to claim 1, wherein the sensing member includes
   a contact part including a contact surface that comes into contact with a wall surface of the panel or the locking surface of the locking projection and a first locking surface that is to be locked to the flange, and
   a sensing part including a second locking surface that is to be locked to the flange and a projection for sensing of the sensing member, and configured to come into contact with the wall of the receiving part.

5. The connector with a grommet according to claim 2, wherein the sensing member includes
   a contact part including a contact surface that comes into contact with a wall surface of the panel or the locking surface of the locking projection and a first locking surface that is to be locked to the flange, and a sensing part including a second locking surface that is to be locked to the flange and the projection for sensing, and configured to come into contact with the wall of the receiving part.

* * * * *